(12) United States Patent
Kawano

(10) Patent No.: US 9,665,252 B2
(45) Date of Patent: May 30, 2017

(54) INFORMATION PROCESSING APPARATUS AND PROGRAM

(71) Applicant: Sony Corporation, Tokyo (JP)

(72) Inventor: Shinichi Kawano, Tokyo (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 14/381,750

(22) PCT Filed: Mar. 11, 2013

(86) PCT No.: PCT/JP2013/056641
§ 371 (c)(1),
(2) Date: Aug. 28, 2014

(87) PCT Pub. No.: WO2013/157322
PCT Pub. Date: Oct. 24, 2013

(65) Prior Publication Data
US 2015/0026636 A1     Jan. 22, 2015

(30) Foreign Application Priority Data
Apr. 18, 2012    (JP) ................................ 2012-094579

(51) Int. Cl.
*G06F 3/048*      (2013.01)
*G06F 3/0484*     (2013.01)
(Continued)

(52) U.S. Cl.
CPC ........ *G06F 3/04842* (2013.01); *G06F 1/1647* (2013.01); *G06F 3/0482* (2013.01);
(Continued)

(58) Field of Classification Search
CPC . G06F 9/455; G06F 17/212–17/30905; G06Q 10/10; G06Q 20/102; G06Q 30/02–30/06; G06Q 40/12; H04L 41/22
See application file for complete search history.

(56) References Cited

U.S. PATENT DOCUMENTS

| 2005/0057498 | A1* | 3/2005 | Gentle | .................. | G06F 9/4446 345/157 |
| 2007/0069005 | A1* | 3/2007 | Dickerson | .............. | G06Q 20/40 235/379 |

(Continued)

FOREIGN PATENT DOCUMENTS

| JP | 2004-070809 | 3/2004 |
| JP | 2005-032041 | 2/2005 |

(Continued)

*Primary Examiner* — Claudia Dragoescu
(74) *Attorney, Agent, or Firm* — Paratus Law Group, PLLC

(57) ABSTRACT

There is provided an information processing apparatus including a screen recognition unit configured to recognize an input element included in a screen, an input information generating unit configured to generate a piece of input information corresponding to the input element, a transition destination information acquiring unit configured to acquire a piece of information about a transition destination of the screen, the piece of information about the transition destination corresponding to the piece of input information, and a transition destination information outputting unit configured to output the piece of information about the transition destination to display the piece of information about the transition destination separately from the screen.

24 Claims, 25 Drawing Sheets

(51) Int. Cl.
  *G06F 3/0482* (2013.01)
  *G06Q 20/18* (2012.01)
  *G06F 1/16* (2006.01)
  *G06F 3/0481* (2013.01)
  *G07F 19/00* (2006.01)

(52) U.S. Cl.
  CPC ......... *G06F 3/04817* (2013.01); *G06Q 20/18* (2013.01); *G07F 19/20* (2013.01); *G07F 19/201* (2013.01)

(56) References Cited

U.S. PATENT DOCUMENTS

| | | | |
|---|---|---|---|
| 2008/0244398 A1* | 10/2008 | Santos-Gomez | G06F 9/4446 715/708 |
| 2009/0007012 A1* | 1/2009 | Mandic | G06F 3/0481 715/810 |
| 2009/0108057 A1* | 4/2009 | Mu | H04M 1/72561 235/375 |
| 2009/0282340 A1* | 11/2009 | Akaike | G11B 27/105 715/732 |

FOREIGN PATENT DOCUMENTS

| | | |
|---|---|---|
| JP | 2005-521130 | 7/2005 |
| JP | 2011-204158 | 10/2011 |

* cited by examiner

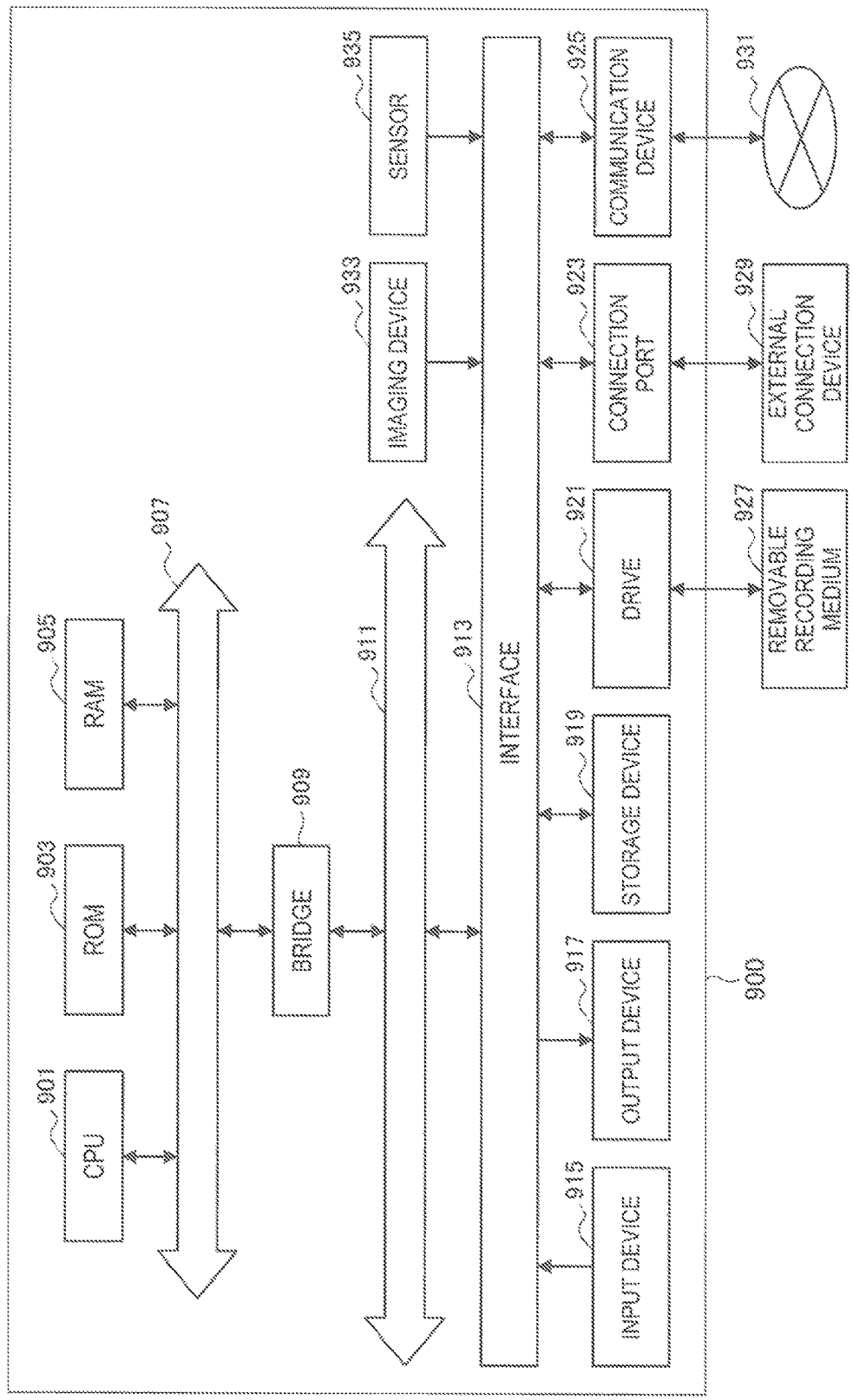

INFORMATION PROCESSING APPARATUS AND PROGRAM

CROSS REFERENCE TO PRIOR APPLICATION

This application is a National Stage Patent Application of PCT International Patent Application No. PCT/JP2013/056641 (filed on Mar. 11, 2013) under 35 U.S.C. §371, which claims priority to Japanese Patent Application No. 2012-094579 (filed on Apr. 18, 2012), which are all hereby incorporated by reference in their entirety.

TECHNICAL FIELD

The present disclosure relates to an information processing apparatus and a program.

BACKGROUND ART

Graphical user interfaces (GUIs) are commonly used as interfaces provided for users to operate apparatuses. A user performs, for example, a predetermined operation of pushing down an operation element such as a button and inputting an item into an input area such as a text box on a screen displayed on a display unit of an apparatus as a GUI to provide a variety of inputs to the apparatus.

Generally speaking, displayed screens transition to other screens on such GUIs in accordance with an input from a user. Operation screens of electronic apparatuses such as mobile phones and home appliances usually transition from main menus schematically displaying functions to detailed menus displaying the functions selected on the main menus. Input addresses and selected links, for example, cause web browsers of computers to sequentially acquire and display new web pages.

Although screens displayed on the GUIs transition to other screens, quite a few users commonly wish to view the pre-transition screens once more. For example, operation screens of electronic apparatuses frequently have "back" buttons located thereon to allow detailed menus to transition to their main menus. Web browsers also have "back" buttons located thereon, so that the web browsers can display again pre-transition web pages cached by the apparatuses.

Patent Literature 1 describes a technique for improving a function of displaying a pre-transition web page on a web browser. This technique has an image of a displayed web page stored to allow a user to check the displayed information about even a no-cache page after transition, for example.

CITATION LIST

Patent Literature

Patent Literature 1: JP 2011-204158A

SUMMARY OF INVENTION

Technical Problem

Some users wish to view pre-transition screens, and others wish to view post-transition screens. The above-mentioned technique does not, however, satisfy those demands. In addition, there are provided no other techniques for satisfying the demands.

The present disclosure has then devised a novel and improved information processing apparatus and program that can display a piece of information about a post-transition screen on a GUI in advance.

Solution to Problem

According to the present disclosure, there is provided an information processing apparatus including a screen recognition unit configured to recognize an input element included in a screen, an input information generating unit configured to generate a piece of input information corresponding to the input element, a transition destination information acquiring unit configured to acquire a piece of information about a transition destination of the screen, the piece of information about the transition destination corresponding to the piece of input information, and a transition destination information outputting unit configured to output the piece of information about the transition destination to display the piece of information about the transition destination separately from the screen.

Furthermore, according to the present disclosure, there is provided a program for causing a computer to execute a function of recognizing an input element included in a screen, a function of generating a piece of input information corresponding to the input element, a function of acquiring a piece of information about a transition destination of the screen, the piece of information about the transition destination corresponding to the piece of input information, and a function of outputting the piece of information about the transition destination to display the piece of information about the transition destination separately from the screen.

A user generates a piece of input information corresponding to an input element for the user to provide an input on a GUI. A piece of information about a transition destination of a screen is acquired and output in advance on the basis of the piece of input information. This allows the user to acquire the piece of information about the post-transition screen before the user actually inputs a piece of information to cause a screen to transition to the post-transition screen.

Advantageous Effects of Invention

According to the present disclosure as described above, it is possible to display a piece of information about a post-transition screen in advance on a GUI.

BRIEF DESCRIPTION OF DRAWINGS

FIG. 25 is a block diagram for describing a hardware configuration of an information processing apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
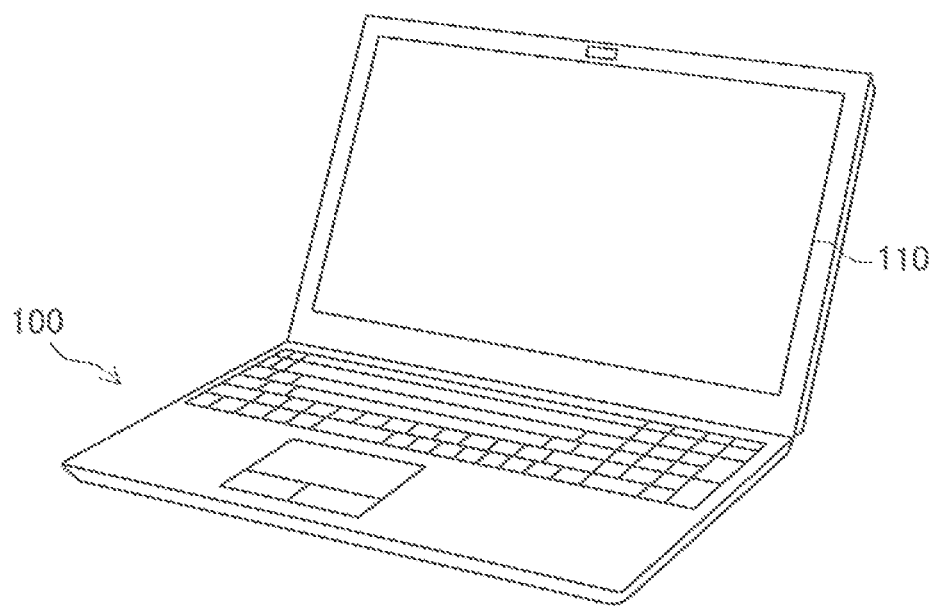
FIG. 1 is a diagram illustrating an external appearance of an information processing apparatus according to a first embodiment of the present disclosure.

The description will be made in the following order.
1. First Embodiment: Transition Destination Display on Web Browser
2. Second Embodiment: Transition Destination Displays
3. Third Embodiment: Displays of Series of Transition Destinations
4. Fourth Embodiment: Display Units
5. Fifth Embodiment: Display on Apparatus Different from Apparatus Displaying Screen
6. Hardware Configuration
7. Supplement 1. First Embodiment: Transition Destination Display on Web Browser First of all, a first embodiment of the present disclosure will be described with reference to FIGS. 1 to 7.
(Apparatus Configuration)
FIG. 1 is a diagram illustrating an external appearance of an information processing apparatus according to a first embodiment of the present disclosure. The information processing apparatus according to the present embodiment is a notebook personal computer (PC) 100 as illustrated in the figure. Examples of the information processing apparatus according to the present embodiment may include a variety of apparatuses such as tablet PCs, desktop PCs, and mobile phones (smartphones) in addition to the illustrated example as long as they have a function of a web browser as discussed below.

Figure 2:
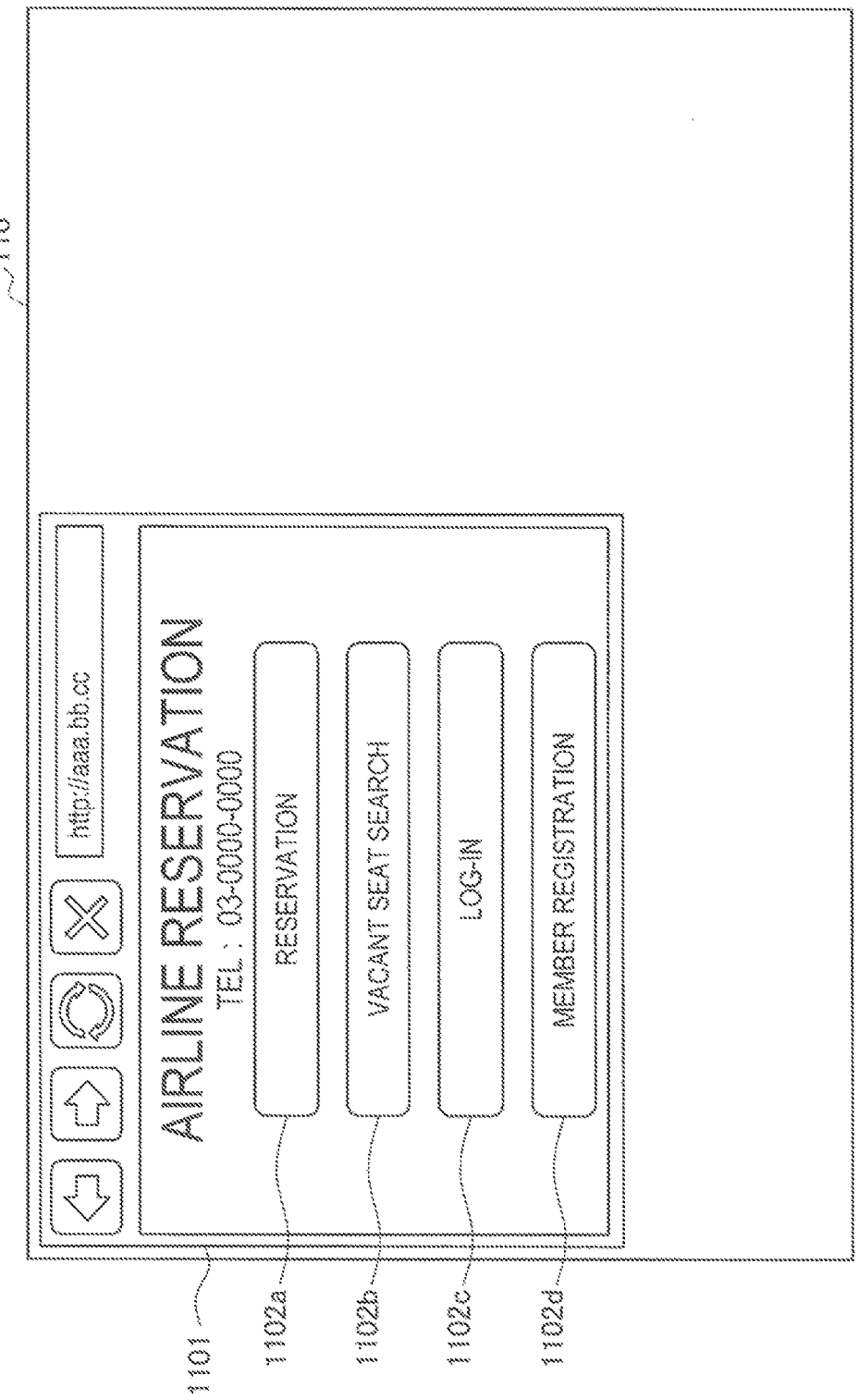
FIG. 2 is a diagram illustrating an example of a screen displayed in the first embodiment of the present disclosure.

The PC 100 includes a display unit 110. For example, the display unit 110 is formed of a liquid crystal display (LCD), an organic electro-luminescence (EL) display, or the like. A web browser displayed on the display unit 110 will be described in the present embodiment, but the display unit 110 may further display a piece of information such as a variety of images and text regarding the processing of the PC 100.
(Example of Screen Display)
FIG. 2 is a diagram illustrating an example of a screen displayed in the first embodiment of the present disclosure. The display unit 110 of the PC 100 displays a web browser screen 1101. The web browser screen 1101, for example, transitions to another screen in accordance with an input address and a selected link. A page for airline reservation is displayed on the web browser screen 1101 in the illustrated example. Needless to say, however, any other pages may be displayed. The design of the illustrated web browser screen 1101 does not limit the embodiments of the present disclosure at all.

The web browser screen 1101 includes a button 1102 as an input element. The button 1102 includes four buttons 1102a to 1102d corresponding to functions such as "reservation" and "vacant seat search," in the illustrated example. Once a user pushes down any button 1102 (more specifically, a user clicks, double-clicks, or taps the button with a mouse, a touch pad, or the like), the web browser screen 1101 transitions to a page corresponding to each function. An input element for causing a screen to transition like the button 1102 will also be referred to as submit element below.

When a user pushes down the button 1102, the PC 100 transmits, to a web server, a piece of information indicating "the button 1102 has been pushed down." This piece of information can be regarded as a piece of input information corresponding to the button 1102, which is an input element. This piece of information is also a piece of input information indicating that the button 1102, which is a submit element, has executed a submit operation.

The web server, which has received the piece of input information indicating "the button 1102 has been pushed down," generates a piece of information about a transition destination of the web browser screen 1101 corresponding to this piece of input information, and then transmits the generated piece of information to the PC 100. The PC 100 causes the web browser screen 1101 to transition in accordance with the piece of information received from the web server.

(No Transition Destination Display)

Figure 3:
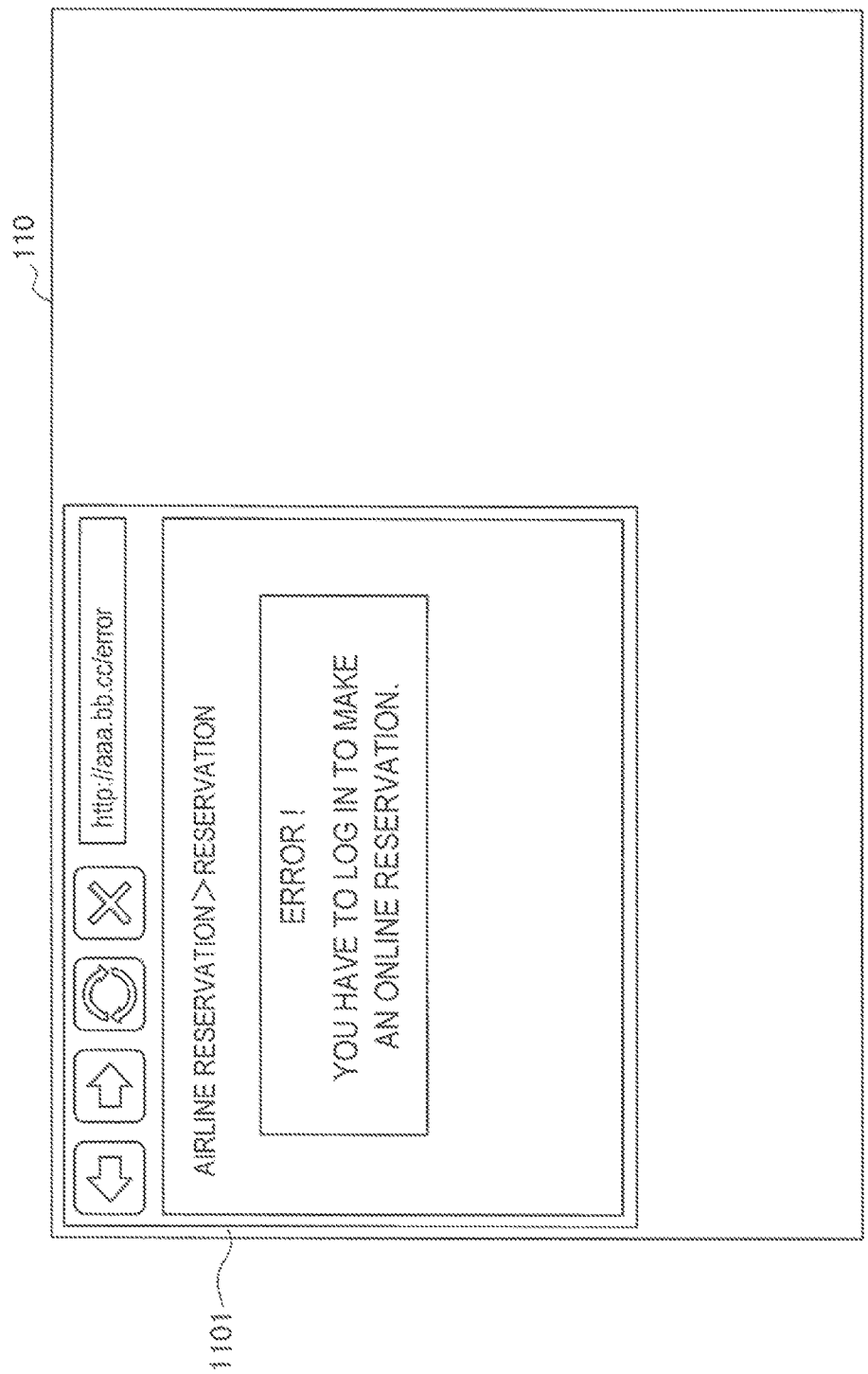
FIG. 3 is a diagram showing that a screen transitions without any transition destination display in the example of FIG. 2.

FIG. 3 is a diagram showing that a screen transitions without any transition destination display in the example of FIG. 2. The button 1102a for "reservation" has been pushed down in the illustrated example. Since a user has not yet logged in in this example, an error message is displayed indicating "you have to log in to make an online reservation."

In this case, a user can return to a pre-transition screen by pushing down the "back" button or the like, for example. However, a no-cache page or the like does not sometimes allow a user to return, for example, after the screen has transitioned. In that case, a user has no choice but to close the browser and then visit the page again. Such circumstances may waste the user's time and bother the user. However, it is difficult for users to predict those circumstances without any transition destination display as discussed below.

Needless to say, it is ideal to design a web page in which, for example, the button 1102a for "reservation" is inactivated or the like for users who have not yet logged in in order to prevent the above-described circumstances. However, it is not always realistic to expect that optimum design from all the web pages.

Accordingly, a piece of information about a transition destination displayed if the button 1102 was pushed down is displayed in advance in the present embodiment to allow a user to know whether pushing down the button 1102 brings a desired result, before the user actually pushes down the button 1102.

(Example of Transition Destination Display)

Figure 4:
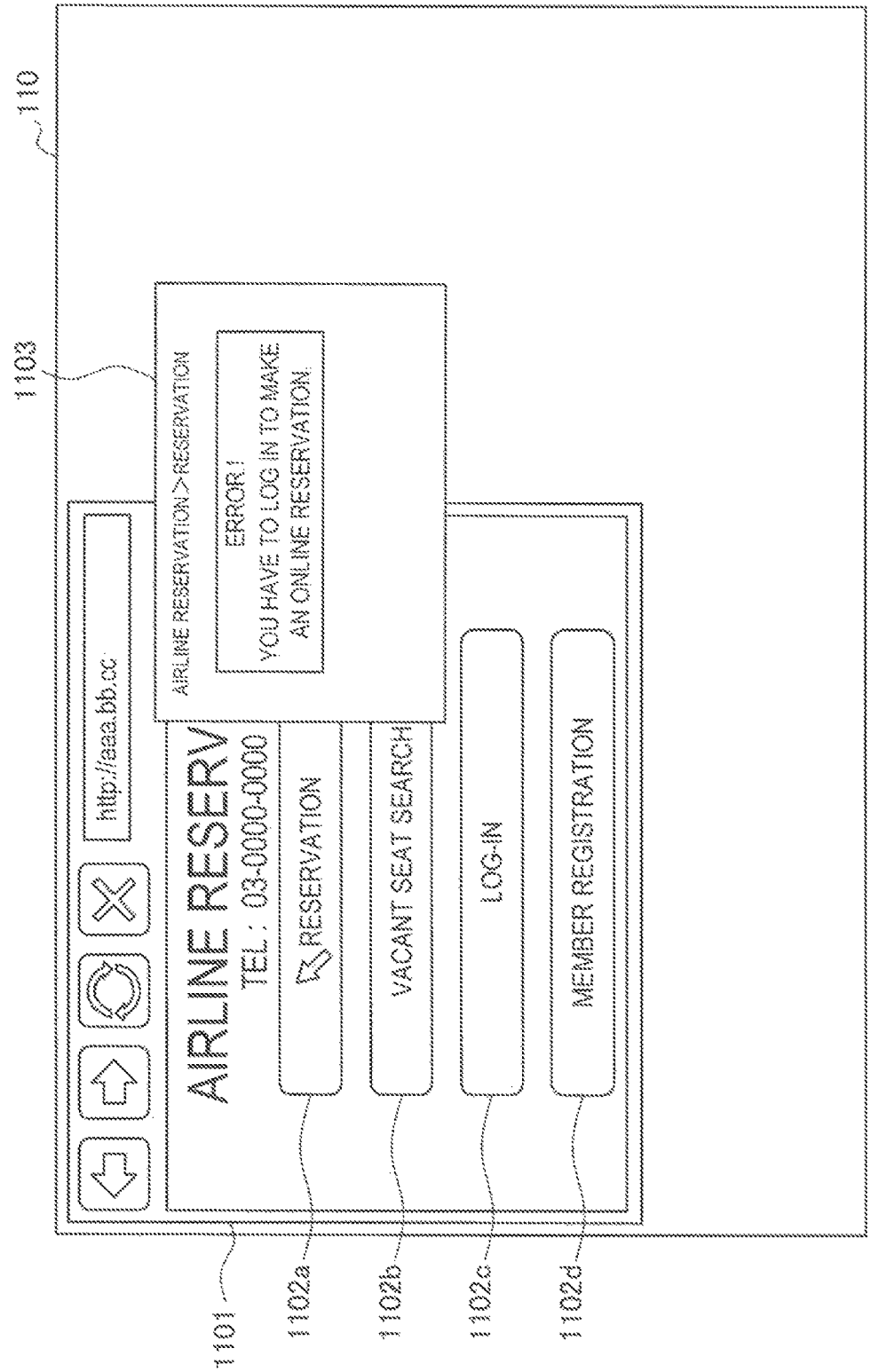
FIG. 4 is a diagram illustrating an example of a transition destination display in the first embodiment of the present disclosure.
Figure 5:
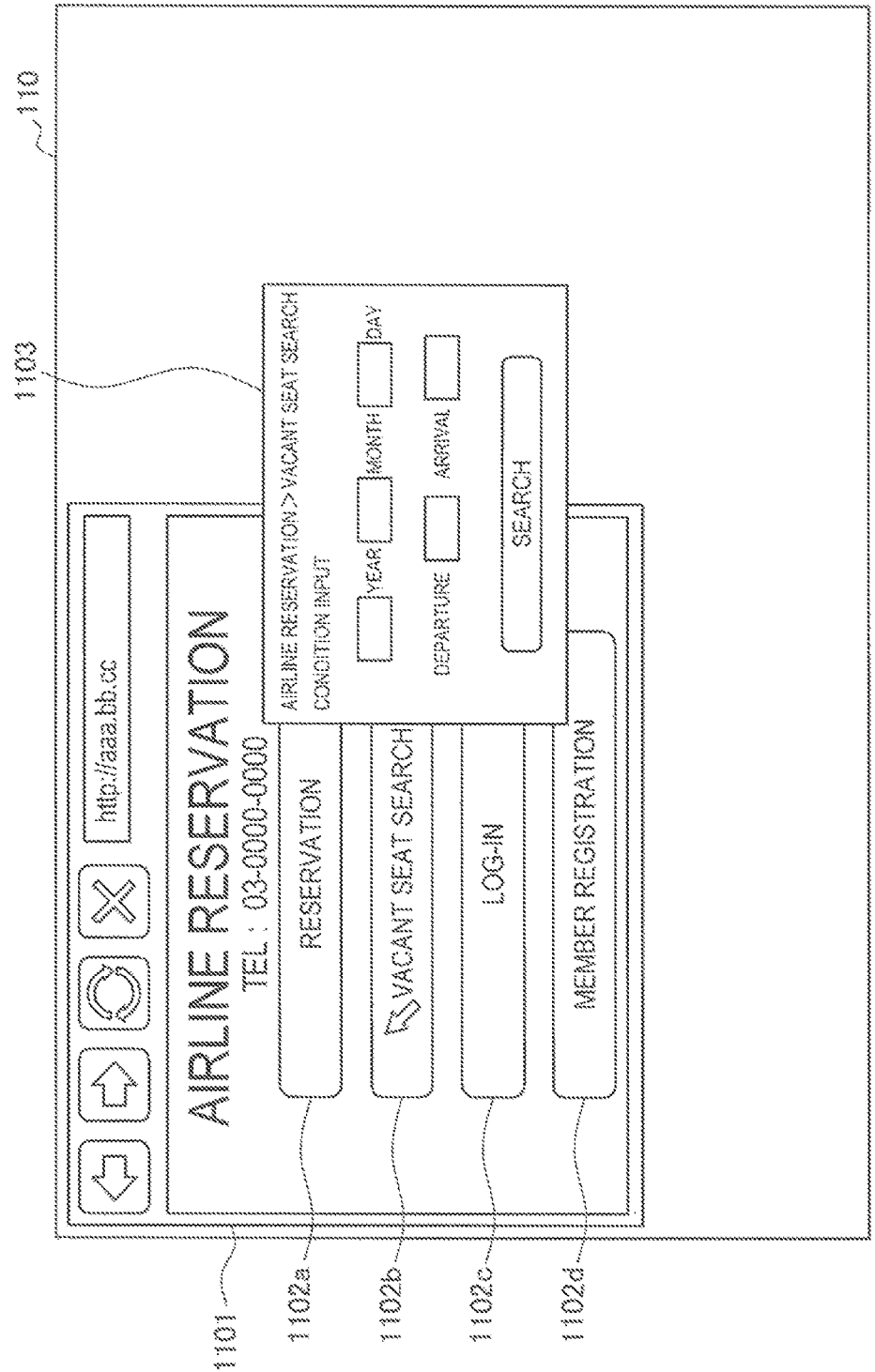
FIG. 5 is a diagram illustrating all example of a transition destination display in the first embodiment of the present disclosure.

FIGS. 4 and 5 are diagrams each of which illustrates an example of a transition destination display according to the first embodiment of the present disclosure. A screen image of a transition destination (error screen in FIG. 3) displayed if the button 1102a for "reservation" was pushed down is displayed as a transition destination display 1103 with a cursor located on the button 1102a (the button 1102a has not yet been pushed down) in the example of FIG. 4.

For example, when the PC 100 newly starts up a session (which will be referred to as sub-session) that is different from a session in which a page is displayed on the web browser screen 1101 (which will also be referred to as main session), and then transmits a piece of input information indicating "the button 1102a has been pushed down" to a web server in that session, a piece of information for displaying the transition destination display 1103 may be acquired. The piece of input information transmitted in the sub-session is not actually input by a user, but generated by the PC 100.

This notifies, in advance, a user that the user would cause a screen to transition to an error screen as illustrated in FIG. 3 and get in trouble if the user pushed down the button 1102a, so that the user can avoid pushing down the button 1102a.

Meanwhile, a screen image of a transition destination displayed if the button 1102b for "vacant seat search" was pushed down is displayed as a transition destination display 1103 with a pointer located on the button 1102b (the button 1102b has not yet been pushed down) in the example of FIG. 5.

This allows a user to recognize, in advance, that a transition destination displayed if the pushed button 1102b was pushed down can be used even when the user has not yet logged in, so that the user can push the button 1102b at his or her ease.

(Functional Block)

Figure 6:
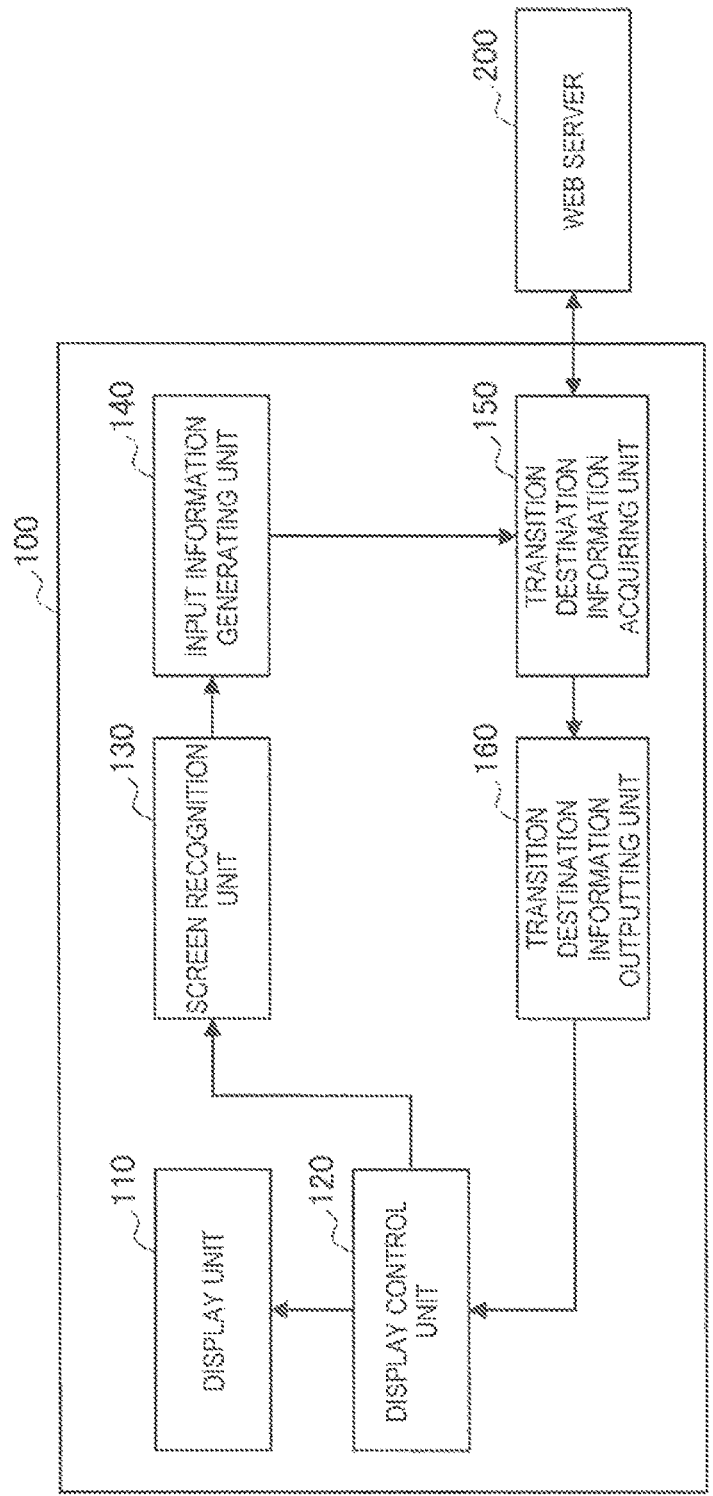
FIG. 6 is a block diagram illustrating a schematic functional configuration of the information processing apparatus according to the first embodiment of the present disclosure.

FIG. 6 is a block diagram illustrating a schematic functional configuration of the information processing apparatus according to the first embodiment of the present disclosure.

The PC 100 includes a display unit 110, a display control unit 120, a screen recognition unit 130, an input information generating unit 140, a transition destination information acquiring unit 150, and a transition destination information outputting unit 160. A structural element other than the display unit 110 may be implemented as software using a central processing unit (CPU), random access memory (RAM), and read only memory (ROM), for example.

The display control unit 120 controls the display unit 110 to display the web browser screen 1101 and the transition destination display 1103 on the display unit 110. The display control unit 120 acquires a piece of information for displaying the web browser screen 1101 from a web server 200 in accordance with a user operation acquired from an operation unit that is not illustrated in the figure. For example, a user operation of actually pushing down the button 1102 displayed on the web browser screen 1101 is acquired, a piece of input information (indicating that the button 1102 has been pushed down) based on this operation is transmitted to the web server 200, and a piece of information about a transition destination of a screen corresponding to the piece of input information is transmitted from the web server, which allows the piece of information for displaying the web browser screen 1101 to be acquired. Additionally, a functional configuration for such "usual screen transition" is omitted in the description for the present embodiment because the functional configuration may be commonly used.

Meanwhile, the display control unit 120 acquires a piece of information about a transition destination for displaying the transition destination display 1103 from the transition destination information outputting unit 160. The piece of information about a transition destination is acquired on the basis of a piece of information about an input element such as the button 1102 included in the currently displayed web browser screen 1101. Accordingly, the display control unit 120 also provides the piece of information for displaying the web browser screen 1101 to the screen recognition unit 130, allowing the piece of information about the transition destination to be acquired.

The screen recognition unit 130 recognizes the button 1102, which is an input element included in the web browser screen 1101, on the basis of the piece of information acquired from the display control unit 120. The piece of information provided from the display control unit 120 to the screen recognition unit 130 may be a source code of a web page, for example. For example, the screen recognition unit 130 may recognize the button 1102 and an attribute set for the button 1102 by detecting a character string from the source code, the character string representing the button 1102.

As an example, when a web page is written in Hyper Text Markup Language (HTML), the screen recognition unit 130 extracts a character string representing a link such as "<a href="reserve.html"><img src="reserve.gif" . . . ></a>" from a source code. Additionally, this character string is displayed as the button 1102 on the web browser screen 1101. The screen recognition unit 130 may further acquire a piece of information such as "href (indicating a link to another page and the like)," and "reserve.html (the uniform resource locator (URL) of a link destination) as an attribute of the button 1102.

The input information generating unit 140 generates a piece of input information corresponding to the input element recognized by the screen recognition unit 130. As discussed above, the piece of input information corresponding to the button 1102, which is a submit element, may indicate that the button 1102 has executed a submit operation. This may be a request to designate the URL "reserve.html" in the example of HTML. Namely, in the present embodiment, the input information generating unit 140 generates, as a piece of input information, a piece of information that would be transmitted to the web server 200 if the button 1102 was pushed down.

The transition destination information acquiring unit 150 acquires, from the web server 200, a piece of information about a transition destination corresponding to the piece of input information generated by the input information generating unit 140. More specifically, for example, the transition destination information acquiring unit 150 transmits a request including the generated piece of input information to the web server 200, and then receives a piece of information about a screen of the transition destination from the web server 200 as a response to the request. As discussed above, when the transition destination is displayed, the web browser screen 1101 in itself does not transition. The transition destination information acquiring unit 150 may thus use a sub-session that is different from a main session used for displaying the web browser screen 1101 to communicate with the web server 200.

The transition destination information outputting unit 160 outputs the piece of information about the transition destination acquired by the transition destination information acquiring unit 150 to the display control unit 120 in order to display the piece of information about the transition destination acquired by the transition destination information acquiring unit 150 as the transition display 1103 separately from the web browser screen 1101. Displaying the piece of information about the transition destination acquired by the transition destination information acquiring unit 150 separately from the web browser screen 1101 means that while the web browser screen 1101 remains displayed, the piece of information about the transition destination acquired by the transition destination information acquiring unit 150 is separately displayed. For example, the transition destination display 1103 may be overlapped with a part of the web browser screen 1101 as in the above-described example. Alternatively, the transition destination display 1103 may be displayed without overlapping with the web browser screen 1101, or may be overlapped with the whole of the web browser screen 1101 to temporarily keep the web part browser screen 1101 from sight.

(Processing Procedure)

Figure 7:
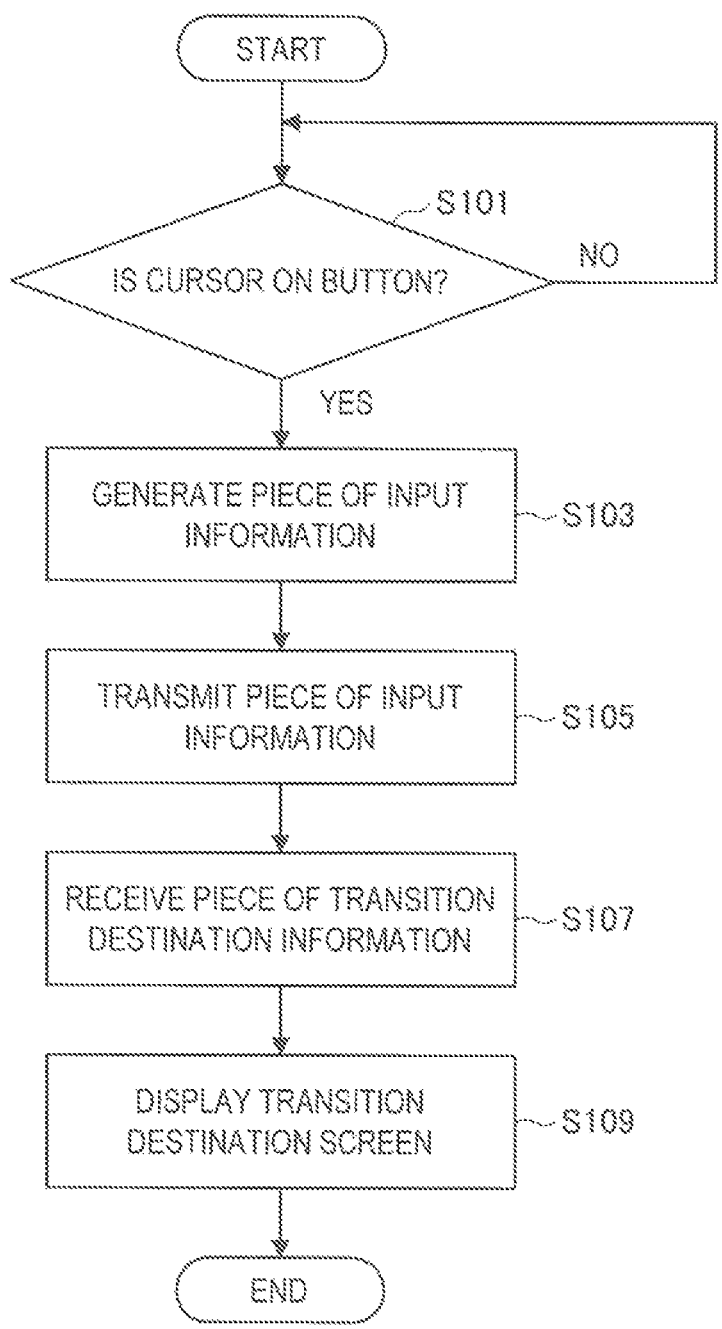
FIG. 7 is a flowchart illustrating an example of processing in the first embodiment of the present disclosure.

FIG. 7 is a flowchart illustrating an example of processing in the first embodiment of the present disclosure.

First of all, the screen recognition unit 130 recognizes the button 1102, which is an input element, references a piece of information about a position of a cursor on the display unit 110, and determines whether or not the cursor is located on the button 1102 (step S101).

Next, the input information generating unit 140 generates a piece of input information corresponding to the button 1102, on which the cursor is located (step S103). The piece of input information generated here may, for example, indicate "the button 1102 has been pushed down."

Next, the transition destination information acquiring unit 150 transmits the piece of input information generated by the input information generating unit 140 to the web server 200 (step S105). As discussed above, the transition destination information acquiring unit 150 may transmit the piece of input information in a sub-session that is different from a main session. For example, if the transition destination display 1103 is newly displayed while a page is displayed on the web browser screen 1101 as in the examples of FIGS. 4 and 5, the transition destination information acquiring unit 150 newly starts up a sub-session and transmits the piece of input information.

Next, the transition destination information acquiring unit 150 receives a piece of transition destination information from the web server 200 (step S107). The piece of transition destination information is a piece of information about a screen generated by the web server 200 on the basis of the piece of input information transmitted in step S105, and may cause normal screen transition if the piece of transition destination information was directly displayed on the web browser screen 1101.

Next, the transition destination information outputting unit 160 provides the received piece of transition destination information to the display control unit 120, and the display control unit 120 displays the transition destination display 1103 on the display unit 110 (step S109). As discussed above, the transition destination display 1103 is displayed separately from the web browser screen 1101 in the present embodiment.

2. Second Embodiment: Transition Destination Displays

Next, a second embodiment of the present disclosure will be described with reference to FIGS. 8 to 11.

Since the present disclosure has the same apparatus configuration and the same functional block as those of the first embodiment, the detailed description will be omitted.

(Example of Transition Destination Display)

Figure 8:
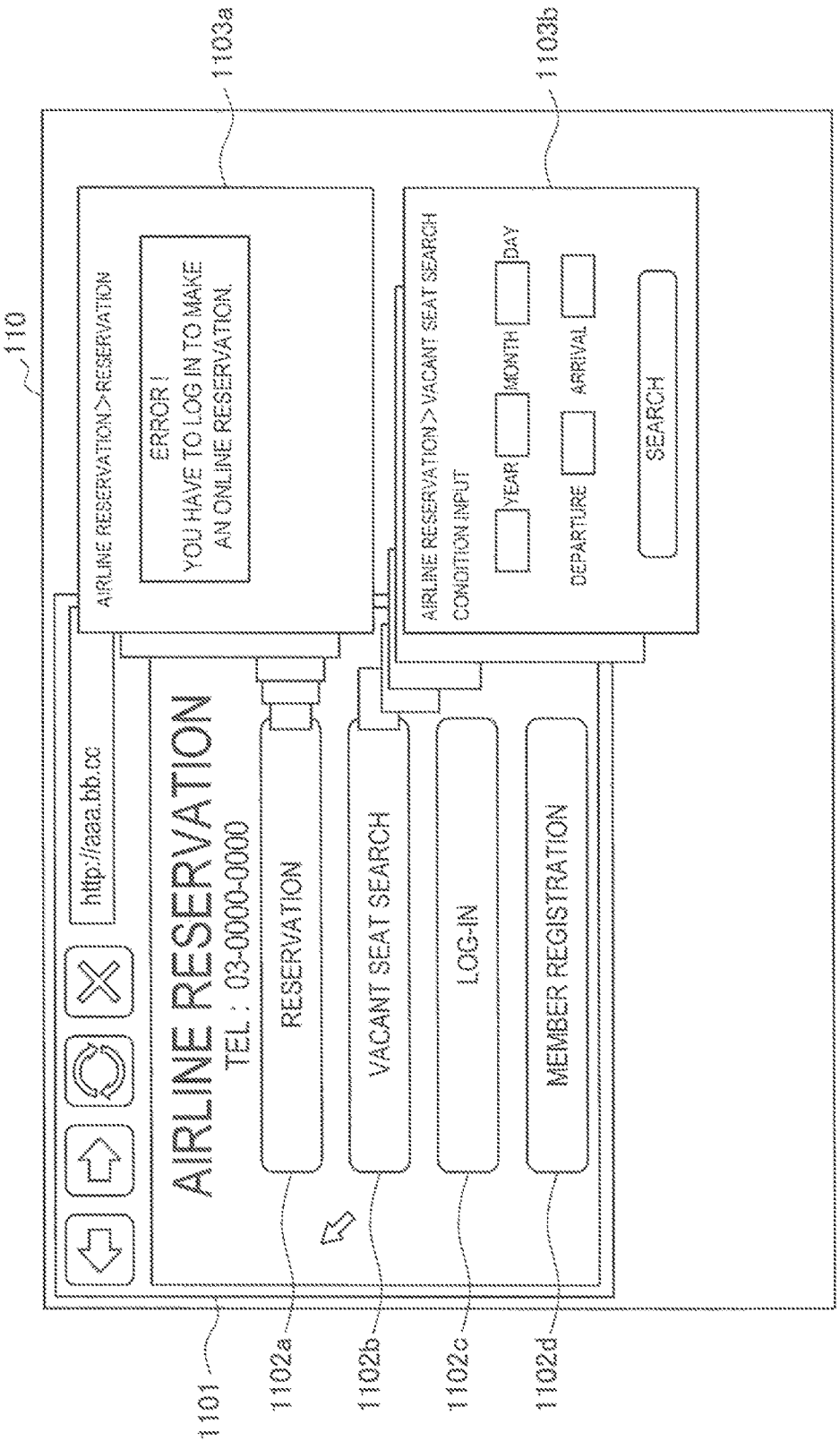
FIG. 8 is a diagram illustrating a first example of a transition destination display in a second embodiment of the present disclosure.

FIG. 8 is a diagram illustrating a first example of a transition destination display in the second embodiment of the present disclosure. A cursor is positioned around space between the button 1102a for "reservation" and the button 1102b for "vacant seat search" in the illustrated example. Once the buttons 1102a and 1102b are pushed down, the next screens are displayed as the transition destination displays 1103a and 1103b, respectively.

In this way, the same transition destination display 1103 described in the first embodiment is displayed for each of the buttons 1102 displayed on the web browser screen 1101 in the present embodiment. A link for associating each button 1102 with the transition destination display 1103 may be displayed as illustrated in the figure to indicate a relationship between each button 1102 and the transition destination display 1103. Alternatively, the transition destination display 1103 may also be overlapped with the corresponding button 1102.

The transition destination display 1103 is displayed for the button 1102 near the cursor in the above-described example, and yet the button 1102 for which the transition destination display 1103 is displayed does not necessarily have to be limited. For example, the transition destination display 1103 may be displayed for all of the buttons 1102a to 1102d.

Figure 9:
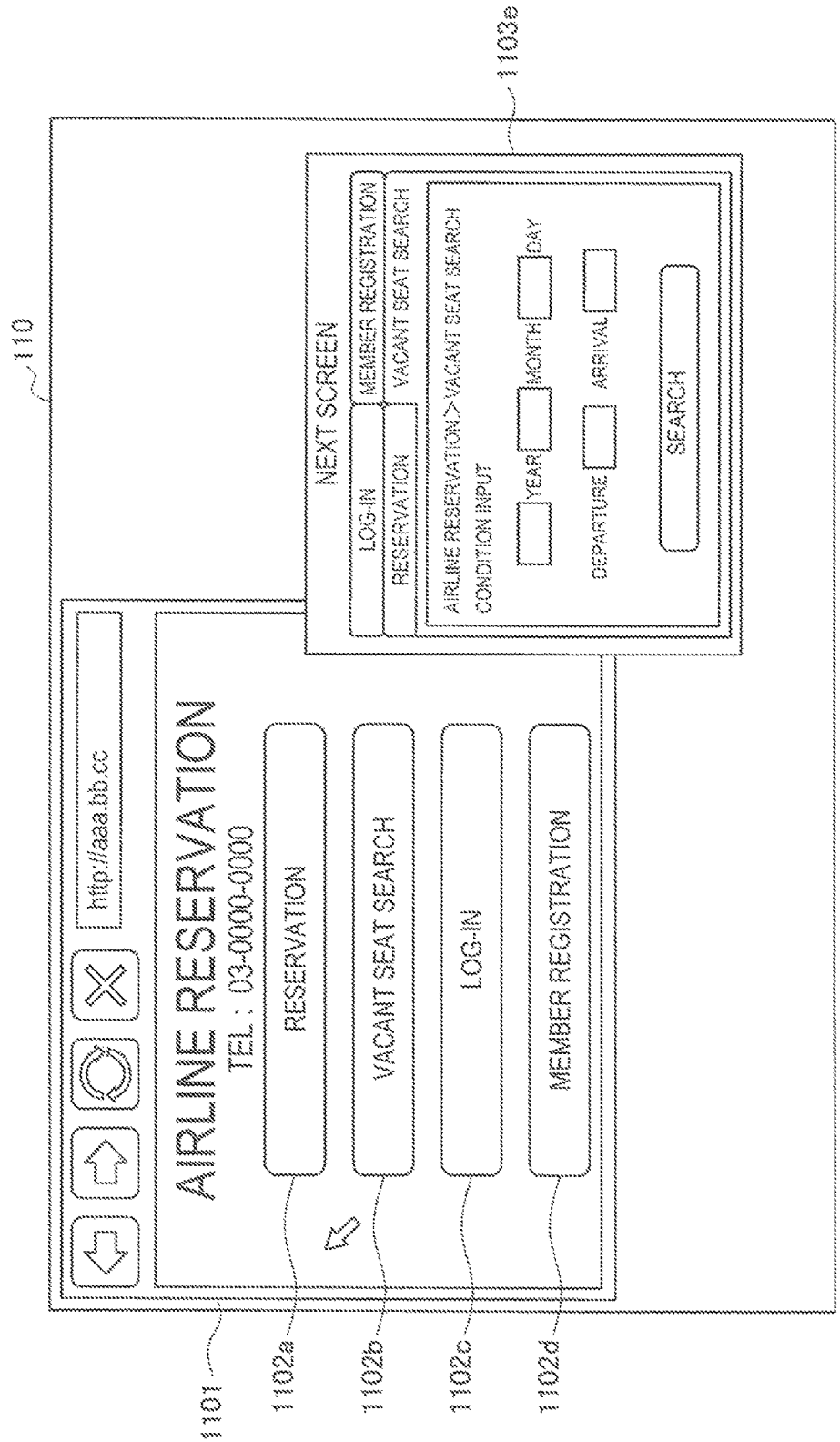
FIG. 9 is a diagram illustrating a second example of a transition destination display in the second embodiment of the present disclosure.

FIG. 9 is a diagram illustrating a second example of a transition destination display in the second embodiment of the present disclosure. The transition destination is displayed as a transition destination display 1103e in the illustrated example when each of the buttons 1102a to 1102d displayed on the web browser screen 1101 is pushed down. For example, it is possible in the transition destination display 1103e to display the next screen by switching tabs having the names of the buttons 1102 once each button 1102 is pushed down.

This allows the transition destination display 1103e for the buttons 1102 to be displayed even when, for example, there are few areas left in the display unit 110. Additionally, the buttons 1102 for which the transition destination display 1103e is displayed do not necessarily have to be all of the buttons 1102 included in the web browser screen 1101. For example, the transition destination display 1103e does not have to be displayed for a typical button displayed on a header, a footer, or the like of a screen (such as a button for returning to the home page and a button for switching languages), although FIG. 9 does not illustrate any of them.

Figure 10:
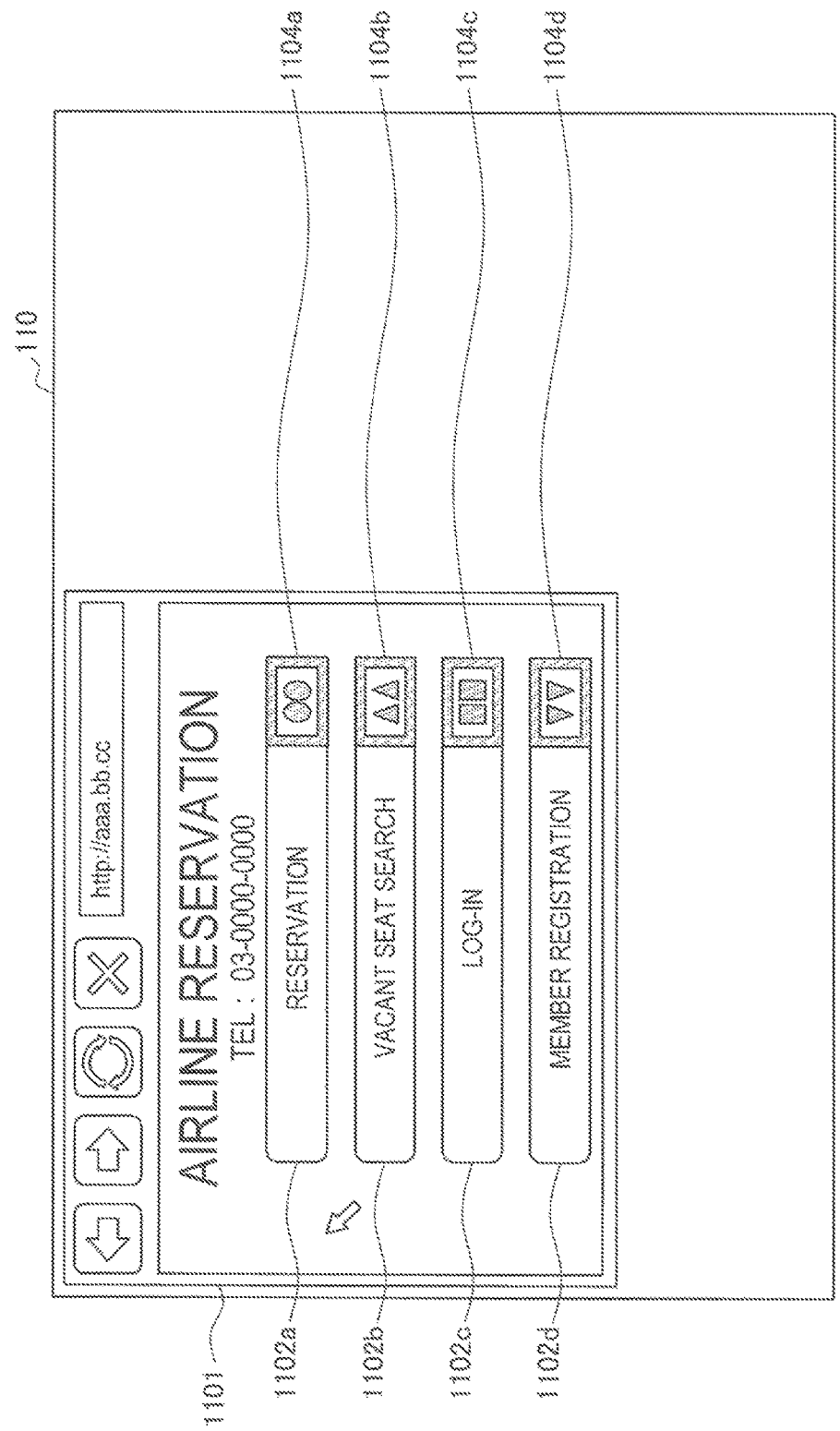
FIG. 10 is a diagram illustrating a third example of a transition destination display in the second embodiment of the present disclosure.

FIG. 10 is a diagram illustrating a third example of a transition destination display in the second embodiment of the present disclosure. The transition destinations are displayed in the illustrated example as transition destination codes 1104a to 1104d when the buttons 1102a to 1102d displayed on the web browser screen 1101 are pushed down, respectively. The transition destination code 1104 is converted into a screen image of a transition destination by another device for acquiring a captured image which includes the display unit 110. A two dimensional code is displayed as the transition destination code 1104 in the illustrated example, and yet another type of code may also be used.

As specific examples of the information processing apparatus 100 and another device for acquiring a captured image which includes the display unit 110, the information processing apparatus 100 includes, for example, a desktop PC and a television set, and the other device includes a smartphone. In this case, a smartphone acquires an image with a camera (imaging device), the image showing the display unit of a PC or a television set, recognizes the transition destination code 1104 included in this image, and displays a screen image of the transition destination using a piece of information included in the transition destination code 1104. The display may be displayed, for example, as augmented reality (AR).

The above-mentioned captured image can display a screen image of a transition destination using even the space around the display unit 110. For example, more screen images can be thus displayed than on the display unit 110 in itself. Accordingly, even when, for example, there are few areas left in the display unit 110, screen images of transition destinations can be displayed for the buttons 1102.

Additionally, a piece of transition destination information may also be displayed in this way using the transition destination code 1104 instead of displaying a screen image even in another embodiment in which a screen image of a transition destination is displayed.
(Processing Procedure)

Figure 11:
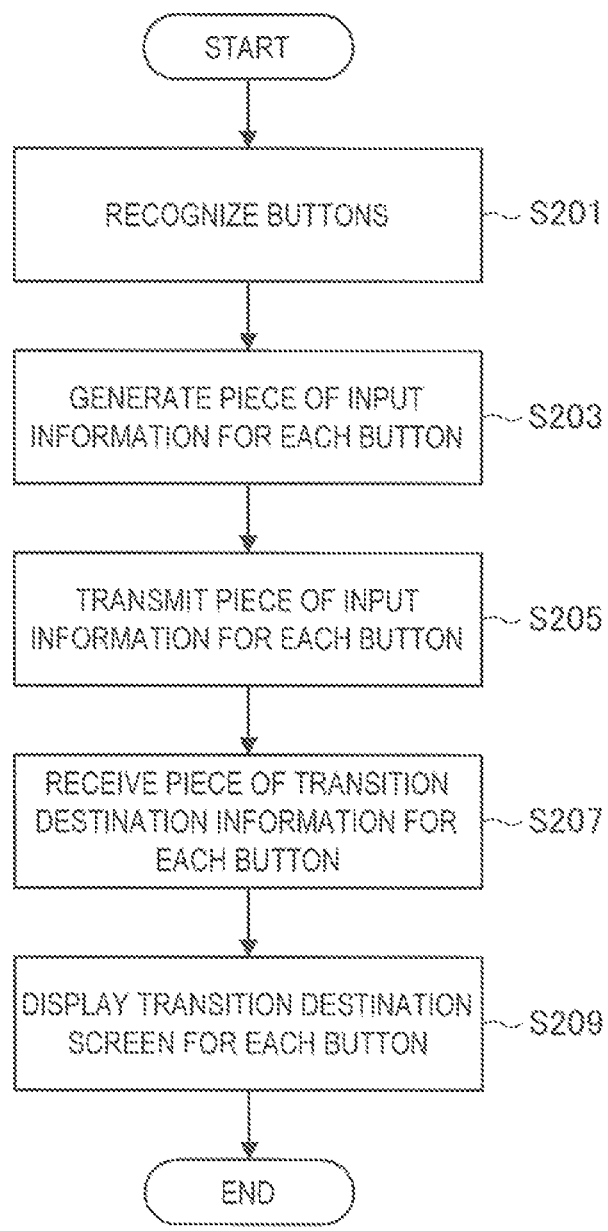
FIG. 11 is a flowchart illustrating an example of processing in the second embodiment of the present disclosure.

FIG. 11 is a flowchart illustrating an example of processing in the second embodiment of the present disclosure.

First of all, the screen recognition unit 130 recognizes the button 1102, which is an input element (step S201). The screen recognition unit 130 recognizes the plurality of buttons 1102 in the present embodiment. All of the buttons 1102 included in the web browser screen 1101 or a part thereof may be recognized. For example, the recognized buttons 1102 may be limited to the buttons 1102 positioned around a cursor on the display unit 110. The buttons 1102 included in areas other than a header and a footer of the screen may be excluded from recognition targets.

Next, the input information generating unit 140 generates pieces of input information corresponding to the recognized buttons 1102 (step S203). Since the plurality of buttons 1102 are recognized in the present embodiment, the input information generating unit 140 generates a piece of input information for each of the buttons 1102. More specifically, the piece of input information generated here may indicate that each of the buttons 1102, which are recognized submit elements, has executed a submit operation.

Next, the transition destination information acquiring unit 150 transmits the piece of input information generated by the input information generating unit 140 to the web server 200 (step S205). The transition destination information acquiring unit 150 may transmit the pieces of input information in separate sub-sessions for the respective buttons 1102. For example, when the two buttons 1102a and 1102b are detected as in the example of FIG. 8, the transition destination information acquiring unit 150 newly starts up two sub-sessions and transmits pieces of input information.

Next, the transition destination information acquiring unit 150 receives pieces of transition destination information from the web server 200 (step S207). The pieces of transition destination information are pieces of information about screens which are generated in the web server 200 on the basis of the pieces of input information transmitted in step S205. If the pieces of transition destination information are displayed on the web browser screen 1101, a screen would normally transition. Since pieces of input information are generated and transmitted for the plurality of buttons 1102 in the present embodiment, the transition destination information acquiring unit 150 receives pieces of transition destination information for the respective buttons 1102.

Next, the transition destination information outputting unit 160 provides the received pieces of transition destination information to the display control unit 120, and the display control unit 120 then displays the transition destination display 1103 (or the transition destination code 1104) on the display unit 110 (step S209). As discussed above, the transition destination display 1103 (or the transition destination code 1104) is displayed in association with the corresponding button 1102 in some way in the present embodiment.

3. Third Embodiment

Displays of Series of Transition Destinations

Next, a third embodiment of the present disclosure will be described with reference to FIGS. 12 to 14.

Since the present disclosure has the same apparatus configuration as that of the first embodiment or the second embodiment, the detailed description will be omitted.
(No Transition Destination Display)

Figure 12:
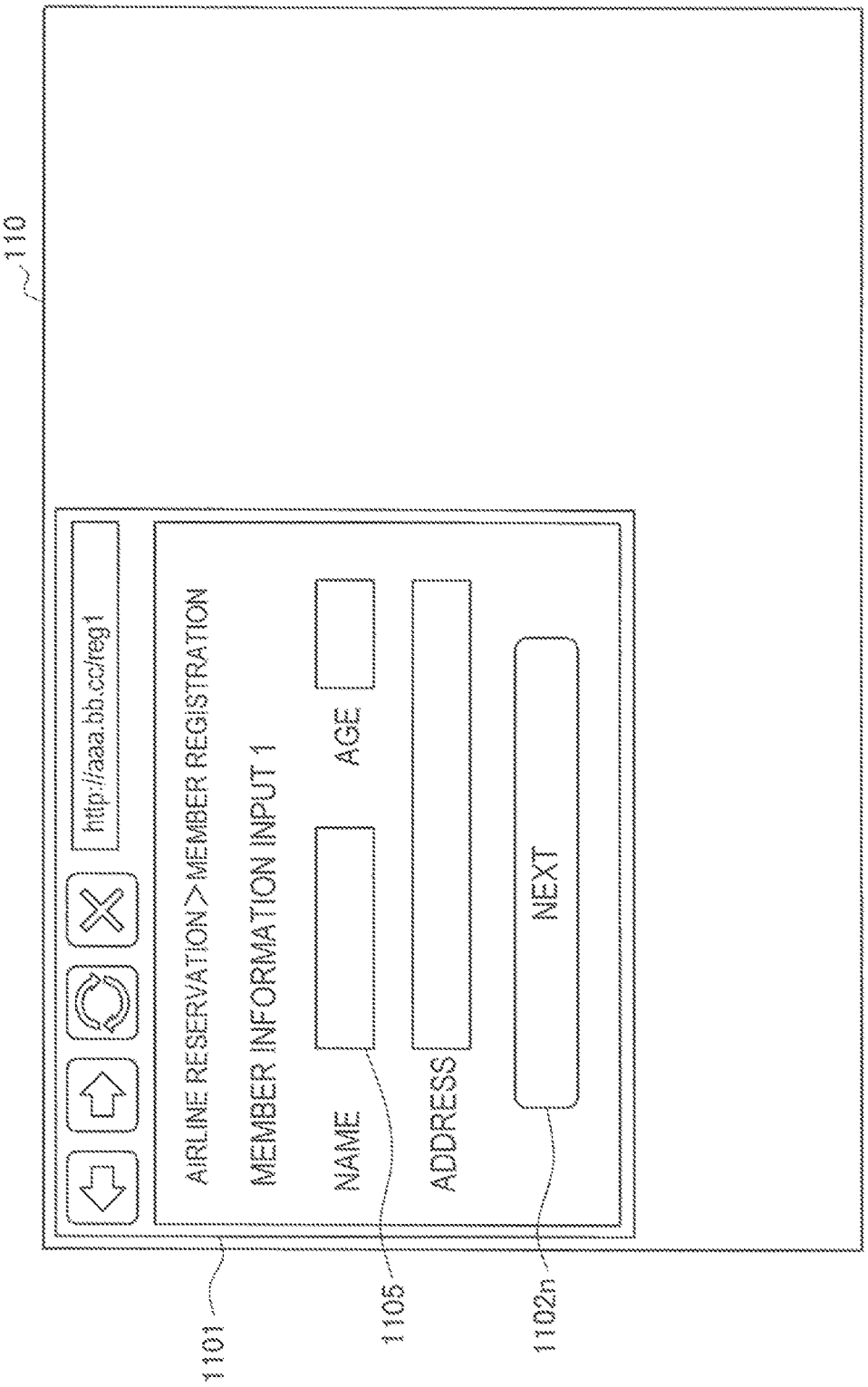
FIG. 12 is a diagram showing that a screen transitions without any transition destination display in the example of FIG. 2.
Figure 13:
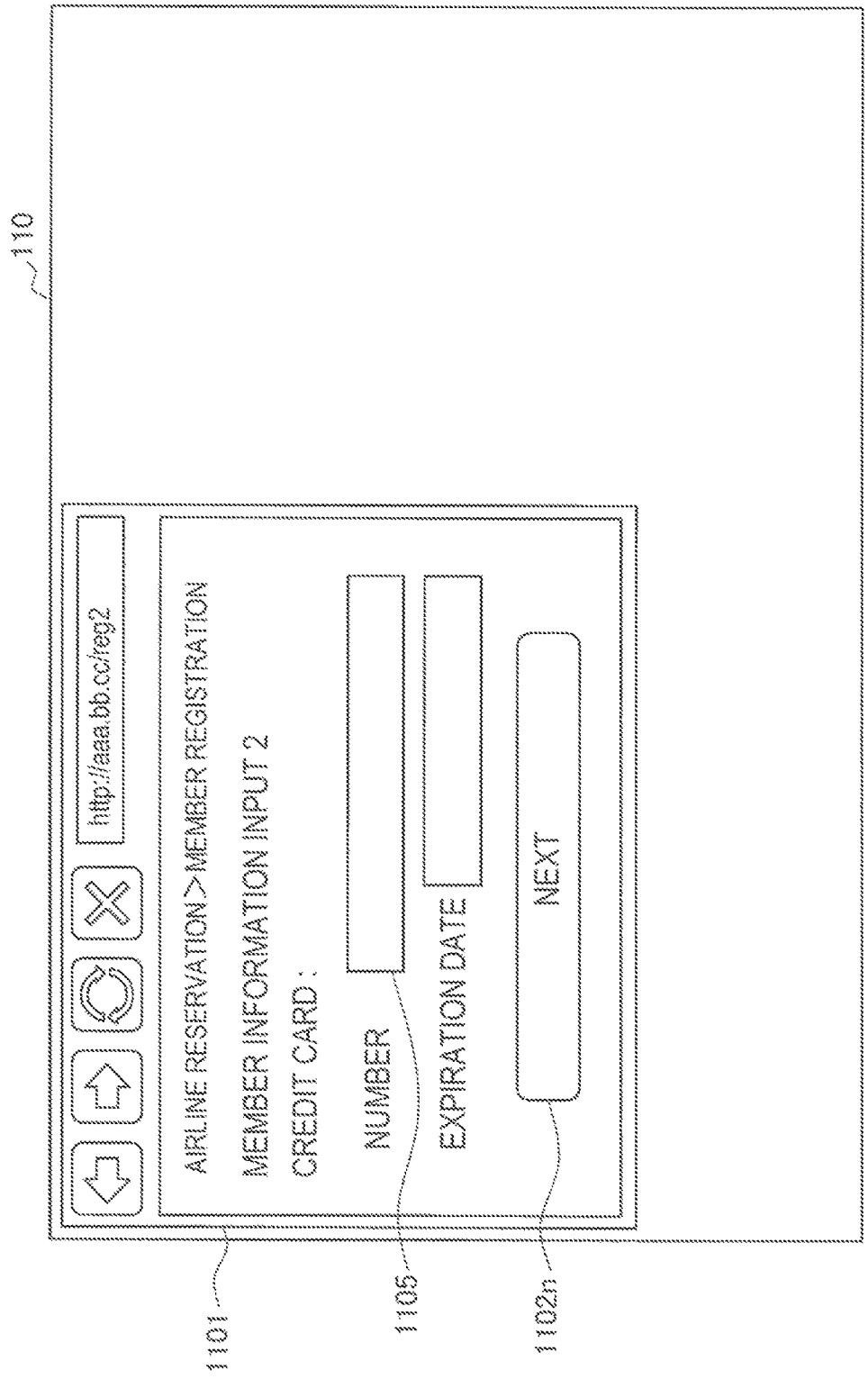
FIG. 13 is a diagram showing that a screen transitions without any transition destination display in the example of FIG. 2.

FIGS. 12 and 13 are diagrams each of which shows that a screen transitions without any transition destination display in the above-described example of FIG. 2. The button 1102d for "member registration" is pushed down in the illustrated example. In this case, the web browser screen 1101 displays, as a transition destination, a first page for member registration illustrated in FIG. 12. The first page includes input boxes 1105 for name, age, and address. After a user inputs predetermined items into the input boxes 1105, the user pushes down a "next" button 1102n. The web browser screen 1101 then transitions to a second page for member registration illustrated in FIG. 13.

The second page for member registration illustrated in FIG. 13 includes input boxes 1105 for credit card number and expiration date. After a user inputs predetermined items into the input boxes 1105, the user pushes down a "next" button 1102n.

Users do not know what kind of item the users are requested to input in the above-described screen transition, until each page is displayed. Accordingly, users who do not, for example, like online payment with their credit cards input their names and addresses on a first page, but do not know that credit-card transactions are requested until a second page is displayed. As a result, the users give up member registration (the users would, for example, choose make a reservation by telephone after all). In this case, users input their names and the like on the first page in vain. Personal information including names is transmitted to the web server 200, which also comes to nothing after all.

(Example of Transition Destination Display)

Figure 14:
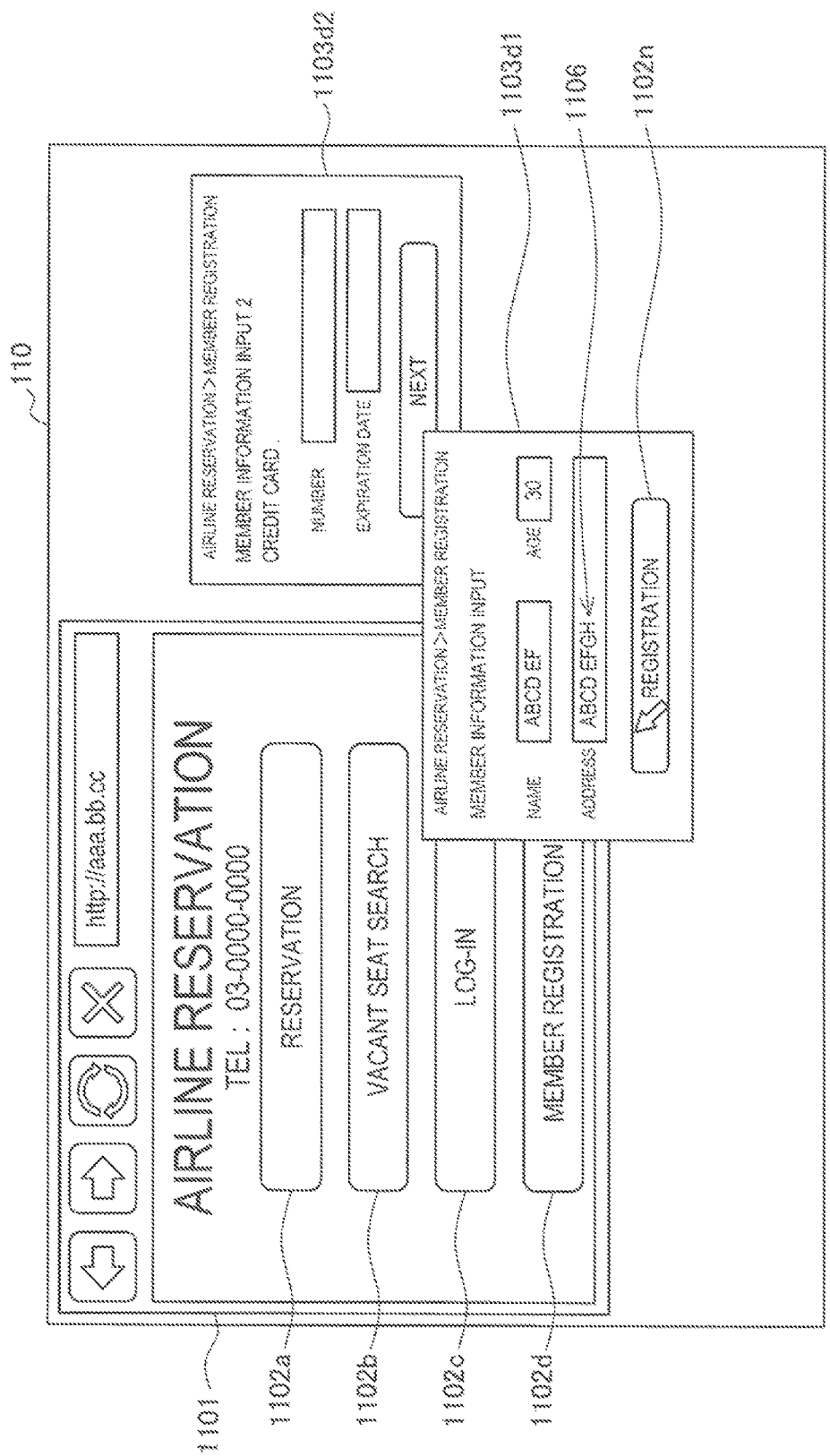
FIG. 14 is a diagram illustrating an example of a transition destination display in a third embodiment of the present disclosure.

FIG. 14 is a diagram illustrating an example of a transition destination display in the third embodiment of the present disclosure. When the "member registration" button 1102d is pushed down with a cursor located on the button 1102d (the button 1102d has not yet been pushed down), a transition destination (first page for member registration illustrated in FIG. 12) is displayed as a first transition destination display 1103d1 in the example of FIG. 14.

Furthermore, when the cursor is moved onto the button 1102n included in the first transition destination display 1103d1, a transition destination (second page for member registration illustrated in FIG. 13) displayed if the button 1102d was pushed down on the first page for member registration is displayed as a second transition destination display 1103d2. Additionally, pieces of information about a series of screens including the first transition destination display 1103d1 and the second transition destination display 1103d2 do not have to be displayed one by one like the example. The pieces of information may be displayed at one time.

A name, age, and address are essential input items on the first page for member registration. An error would be displayed without inputting these items, even if the "next" button 1102n is pushed down. Accordingly, when the second transition destination display 1103b is displayed after the input information generating unit 140 displays the first transition destination display 1103a, the input information generating unit 140 generates dummy items 1106 (name "ABCD EF," age "30," and address "ABCD EFGH" in the figure) of the input items on the first transition destination display 1103a and then transmits them to the web server 200 as a piece of input information along with a piece of information indicating "the button 1102n has been pushed down."

This allows a user to grasp transition of screens displayed if the user pushed down the button 1102, while the user does not have to take the trouble to input the items and avoids the risk of transmitting unnecessary information to the web server. Thus, as in the example of users who do not like online payment, the user can avoid pushing down some button 1102 without any trouble and risk if screen transition after the button 1102 is pushed down leads to a disappointing result.

(Functional Block)

Returning to FIG. 6, a difference between the functional block of the information processing apparatus in the present embodiment and the functional block in the first embodiment will be primarily described.

The screen recognition unit 130 recognizes the button 1102, which is an input element included in the web browser screen 1101, on the basis of the piece of information acquired from the display control unit 120 in the present embodiment, and also recognizes the input box 1105. The input box 1105 is also an input element in the present embodiment. An input element for inputting an item such as text like the input box 1105 will be also referred to as entry element below.

The screen recognition unit 130 acquires not only a piece of information about a screen displayed as the web browser screen 1101, but also a piece of information about a screen displayed as the transition destination display 1103 from the display control unit 120, and then recognizes the button 1102 and the input box 1105 included in a screen image of the transition destination display 1103. Additionally, the piece of information about a screen displayed as the transition destination display 1103 may be provided from the transition destination information outputting unit 160.

The input information generating unit 140 not only generates a piece of input information corresponding to the button 1102, which is a submit element, but also generates a piece of input information corresponding to the input box 1105, which is an entry element. The piece of input information corresponding to the input box 1105 corresponds to an item input into the input box 1105, which is namely a piece of text information such as a name and an address in the above-described example. As discussed above, the input information generating unit 140 may generate the predefined dummy item 1106 of the piece of information about the item as a piece of input information.

The screen recognition unit 130 recognizes an input element in not only a screen displayed as the web browser screen 1101, but also a screen displayed as the transition destination display 1103 in the present embodiment. Accordingly, the input information generating unit 140 also generates a piece of input information for not only the screen displayed as the web browser screen 1101, but also the screen displayed as the transition destination display 1103.

The transition destination information acquiring unit 150 acquires a piece of information about a transition destination corresponding to the piece of input information generated by the input information generating unit 140 from the web server 200. As discussed above, a piece of input information is set for an entry element in the present embodiment. Accordingly, a piece of information about a transition destination can be acquired, for example, in a screen in which an essential input item has been set.

When the transition destination information acquiring unit 150 acquires a piece of information about a transition destination corresponding to a piece of input information generated for a screen displayed as the transition destination display 1103, the transition destination information acquiring unit 150 may keep using the sub-session in which the transition destination information acquiring unit 150 has acquired a piece of information about a screen of the original transition destination. For example, the transition destination information acquiring unit 150 may communicate with the web server 200 in the above-described example by using a sub-session in which the transition destination information acquiring unit 150 has acquired a piece of information for displaying the transition destination display 1103d1.

The transition destination information outputting unit 160 outputs the piece of information about the transition destination acquired by the transition destination information acquiring unit 150 to the display control unit 120 to display the piece of information about the transition destination acquired by the transition destination information acquiring unit 150 as the transition destination display 1103 separately from the web browser screen 1101. As discussed above, in addition to the transition destination display 1103d1, which is the next transition destination of the current browser screen 1101, the transition destination display 1103d2, which is the further next transition destination, is also displayed as a piece of information about a transition destination in the present embodiment. The transition destination information outputting unit 160 acquires pieces of information about these transition destinations one by one, and then provides the acquired pieces of information to the display control unit 120.

For example, when a user is satisfied with a result of transition indicated by a series of pieces of transition destination information, the information processing apparatus 100 may have a function of causing the actual web browser screen 1101 transition as indicated by the pieces of transition destination information in accordance with an operation of the user in each embodiment of the present disclosure. In this case, the transition destination information acquiring unit 150 may use, for example, a main session in which the web browser screen 1101 is caused to display a page to transmit the series of pieces of input information again to the web server, and then cause the web browser screen 1101 to transition. If the dummy item 1106 set for an entry item exists, the dummy item 1106 is replaced with the true item that has been registered in advance.

4. Fourth Embodiment: Display Units

Next, a fourth embodiment of the present disclosure will be described with reference to FIGS. 15 to 18.
(Apparatus Configuration)

Figure 15:
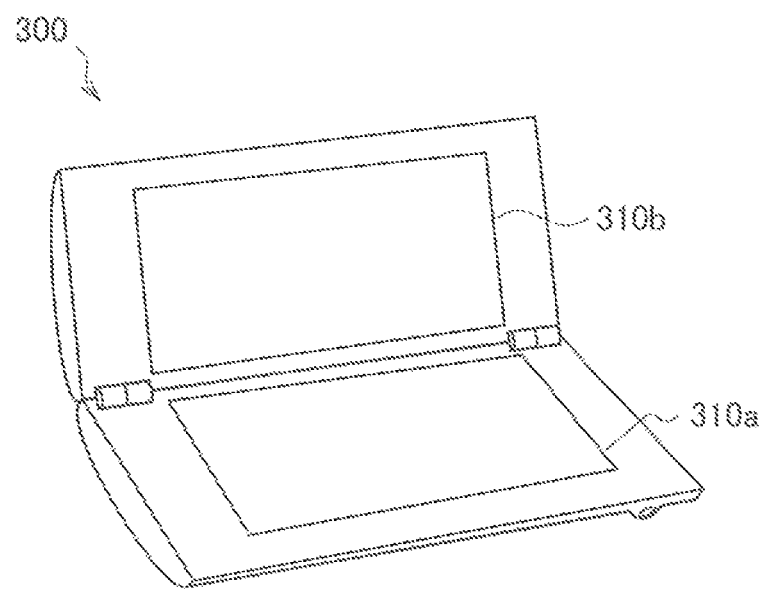
FIG. 15 is a diagram illustrating an external appearance of an information processing apparatus according to a fourth embodiment of the present disclosure.

FIG. 15 is a diagram illustrating an external appearance of an information processing apparatus according to the fourth embodiment of the present disclosure. A PC 300 according to the present embodiment is a folding tablet PC as illustrated in the figure. Additionally, examples of the information processing apparatus according to the present embodiment may include a variety of apparatuses such as mobile phones (smartphones) equipped with a plurality of display units as discussed below and having a function of a web browser in addition to the illustrated example.

The PC 200 includes two display units 310a and 310b. These display units 310 are formed of LCDs or organic EL displays, for example. A web browser displayed on the display units 310 will be described in the present embodiment, and yet the display units 310 may additionally display a variety of information such as images and text relating to the processing of the PC 300.
(Examples of Screen Display and Transition Destination Display)

Figure 16:
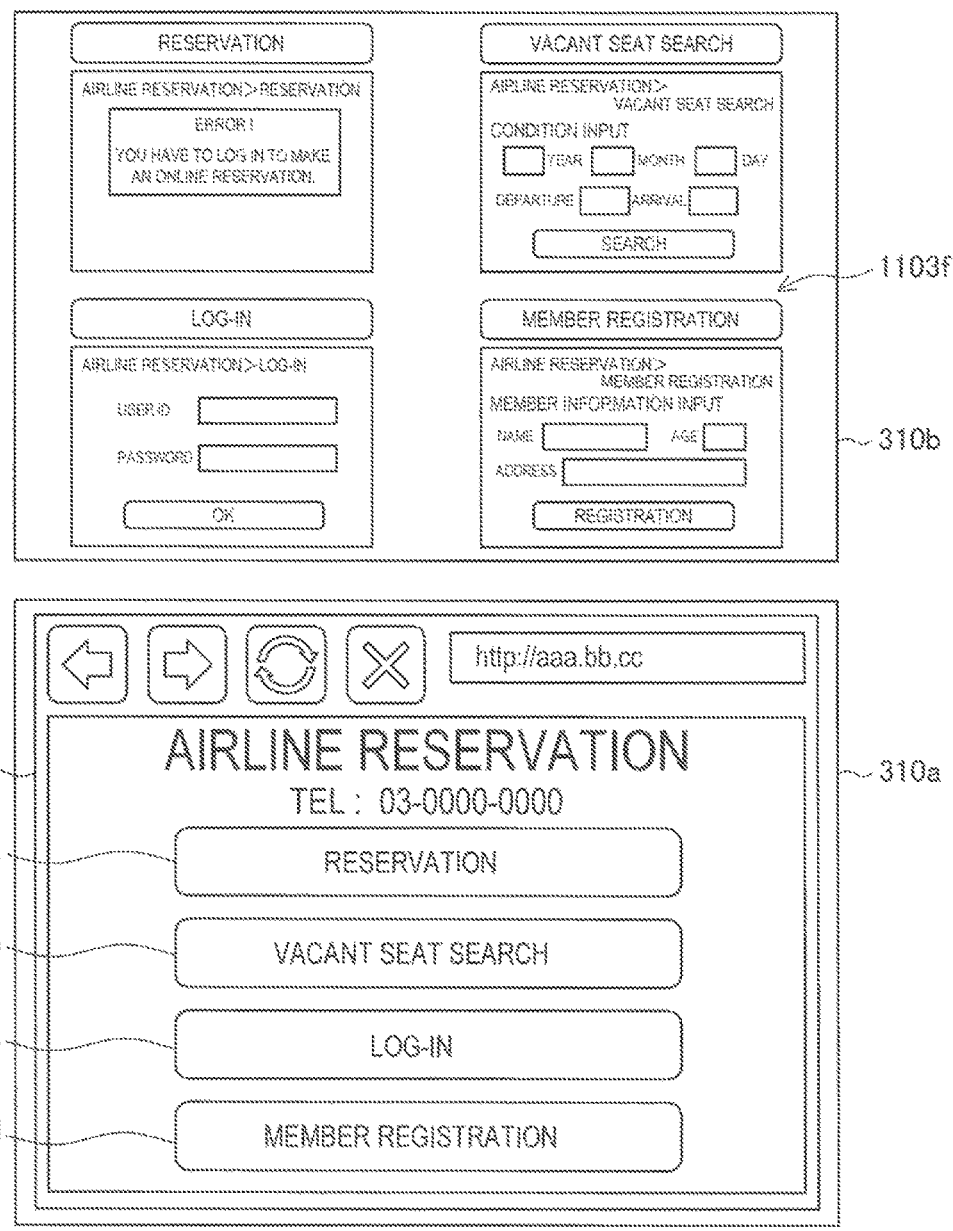
FIG. 16 is a diagram illustrating a first example of a transition destination display in the fourth embodiment of the present disclosure.

FIG. 16 is a diagram illustrating a first example of a transition destination display in the fourth embodiment of the present disclosure. The display unit 310a displays the same web browser screen 1101 as illustrated in FIG. 2 in the illustrated example. Meanwhile, the display unit 310b displays a transition destination display 1103f showing a transition destination displayed if the buttons 1102a to 1102d displayed on the web browser screen 1101 were each pushed down. The transition destination display 1103f may display icons (illustrated as "reservation," "vacant seat search," and the like) corresponding to the buttons 1102a to 1102d in order to show relationships of the transition destination display 1103f with the respective buttons 1102.

This example is the same as the second embodiment in that pieces of information about a plurality of destinations corresponding to the plurality of buttons 1102 are displayed. Thus, the configuration in the second embodiment for displaying pieces of information about a plurality of destinations may be also applied to the present embodiment.

The display unit 310a for displaying the web browser screen 1101 is separate from the display unit 310b for displaying the transition destination display 1103 in the above-described example. Accordingly, even if the web browser screen 1101 includes, for example, the plurality of buttons 1102, the transition destination display 1103 having enough space can be displayed.

Figure 17:
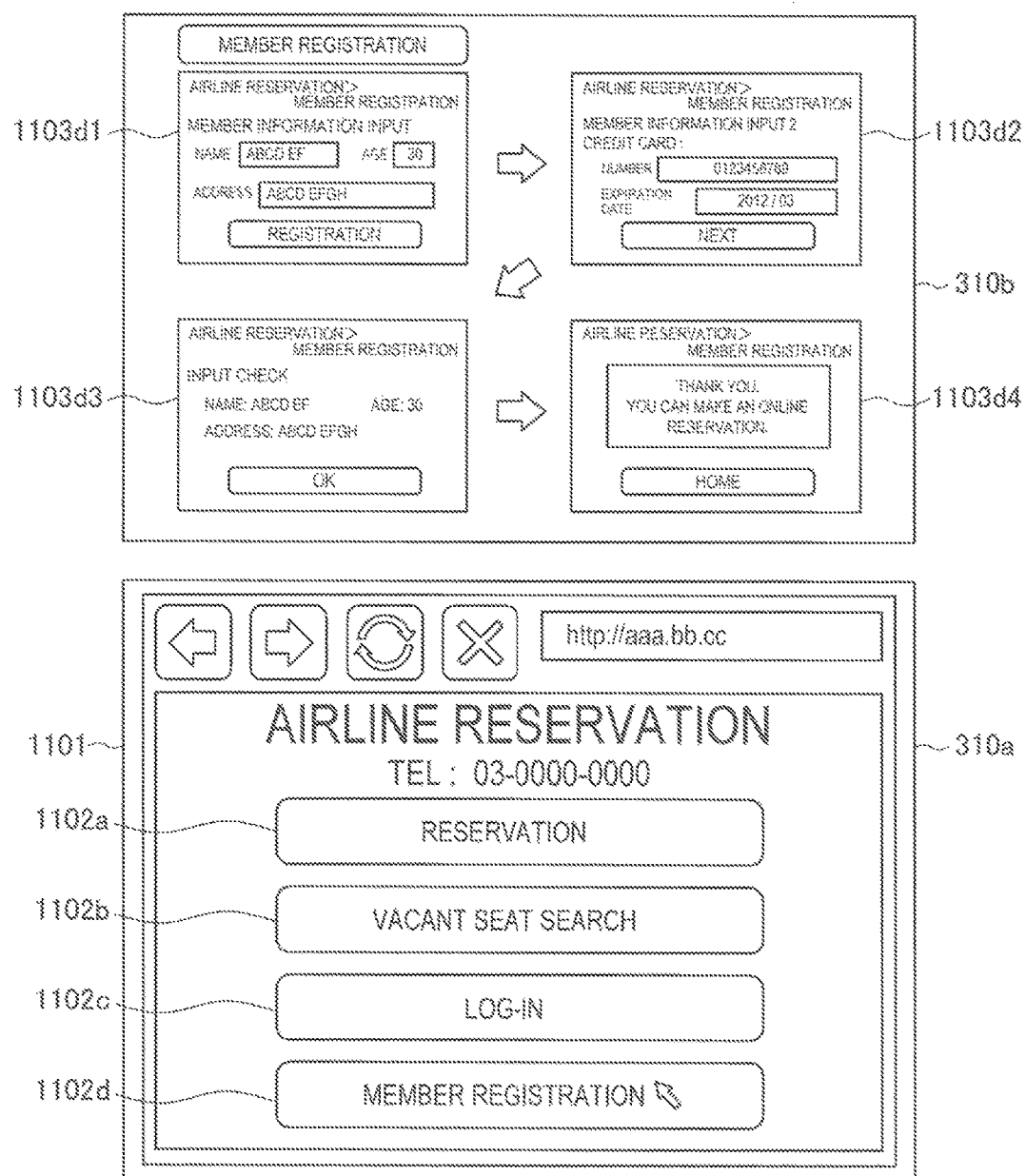
FIG. 17 is a diagram illustrating a second example of a transition destination display in the fourth embodiment of the present disclosure.

FIG. 17 is a diagram illustrating a second example of a transition destination display in the fourth embodiment of the present disclosure. The display unit 310a displays the same web browser screen 1101 as illustrated in FIG. 2 in the illustrated example. Meanwhile, the display unit 310b displays a series of screen transition as transition destination displays 1103d1 to 1103d4, the series of screen transition being displayed when the "member registration" button 1102d displayed on the web browser screen 1101 is pushed down. The transition destination displays 1103d1 to 1103d4 may display an icon (illustrated as "member registration) corresponding to the button 1102d to show relationships between the transition destination displays 1103d1 to 1103d4 and the button 1102d.

This example is the same as the third embodiment in that pieces of information about a series of transition destinations corresponding to the button 1102 are displayed. Thus, the configuration in the third embodiment for displaying information about a series of transition destinations can also be applied to the present embodiment.

The display unit 310a for displaying the web browser screen 1101 is separate from the display unit 310b for displaying the transition destination display 1103 in the above-described example. Accordingly, even if for example, the button 1102 causes screen transition over a lot of screens, the transition destination display 1103 having enough space can be displayed.

A series of screen transition displayed as the transition destination display 1103 may, for example, keep a screen that transitions after the button 1102 is pushed down displayed until a series of processing is completed. For example, a "home" button is displayed like the illustrated example, and then a screen in which transition back to a screen appears that is currently displayed on the web browser screen 1101 (or that has ever been displayed on the web browser screen 1101) is performed, allowing the completion of the series of processing to be recognized.

A series of screen transition displayed as the transition destination display 1103 may indicate a predetermined number of screen transition. For example, when a user operation defines the number of screen transition as two times in the illustrated example, the transition destination displays 1103d1 to 1103d2 are displayed.

Furthermore, if a series of screen transition includes a branch, which means that a screen includes the buttons 1102 that can be pushed down, and transition screens are different for each of the buttons 1102 to be pushed down, the transition destination display 1103 may branch off on the way. Alternatively, a transition destination display 1103g may be limited to the button 1102 corresponding to a predefined main use case.

For example, this series of screen transition may be displayed as arranged still images, which are screen images of transition destinations, like the illustrated example. A series of screen transition may also be displayed as moving images including still images in succession, the still images being screen images of transition destinations.

Additionally, the configuration as illustrated above for displaying the series of screen transition can also be applied to the third embodiment.

(Functional Block)

Figure 18:
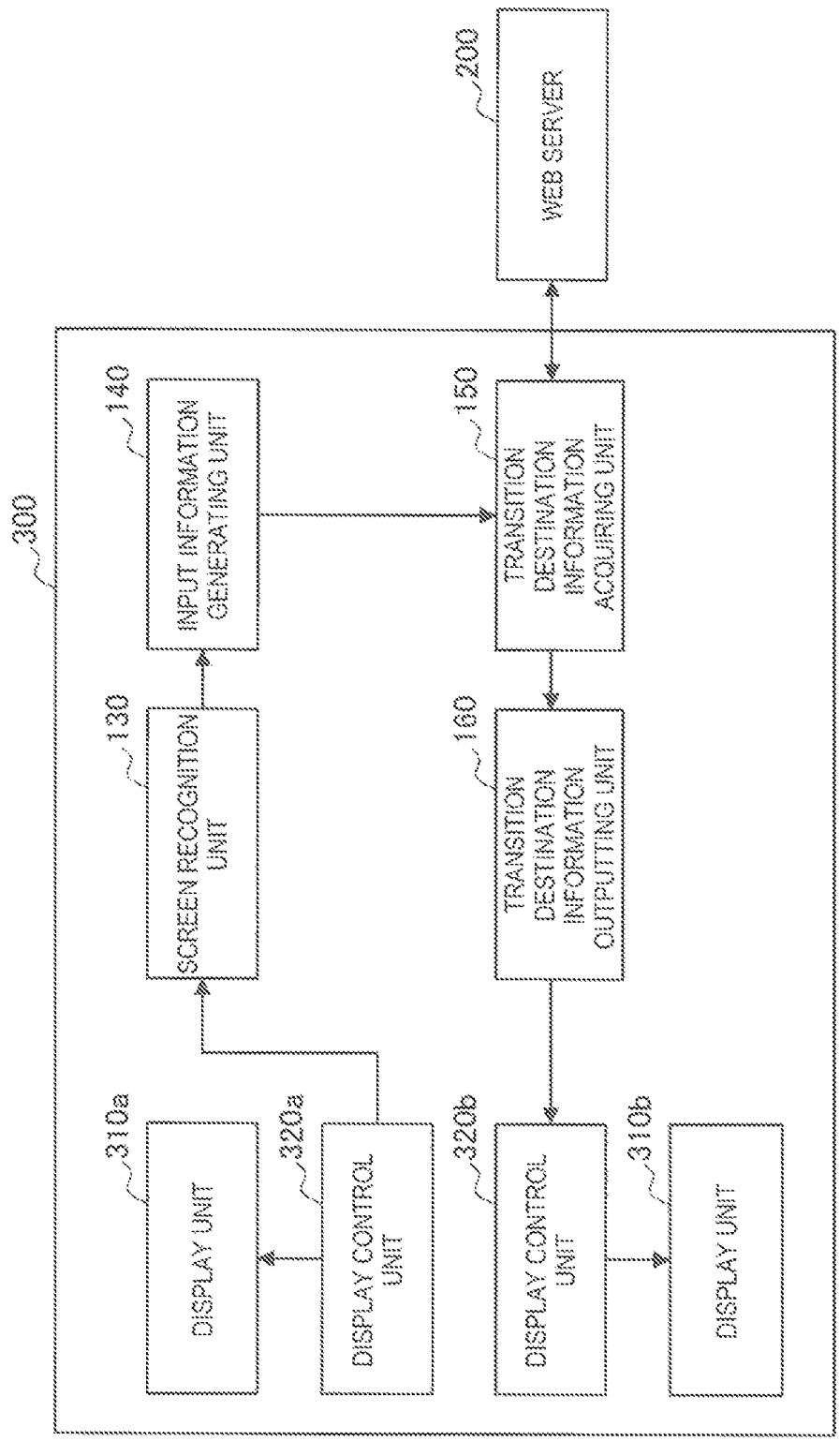
FIG. 18 is a block diagram illustrating a schematic functional configuration of the information processing apparatus according to the fourth embodiment of the present disclosure.

FIG. 18 is a block diagram illustrating a schematic functional configuration of the information processing apparatus according to the fourth embodiment of the present disclosure.

The PC 300 includes display units 310a and 3110b, display control units 320a and 320b, a screen recognition unit 130, an input information generating unit 140, a transition destination information acquiring unit 150, and a transition destination information outputting unit 160. A structural element other than the display units 310a and 310b may be implemented as software using a CPU, RAM, and ROM, for example.

A part of the functional configuration that can be the same as any one of the first to third embodiments is assigned the same sign, which omits the detailed description.

The display control unit 320a controls the display unit 310a to display the web browser screen 1101 on the display unit 310a. The display control unit 320a acquires a piece of information for displaying the web browser screen 1101 from the web server 200 in accordance with a user operation acquired by an operation unit that is not illustrated in the figure. The display control unit 320a provides the piece of information for displaying the web browser screen 1101 to the screen recognition unit 130, allowing a piece of information about a transition destination to be acquired.

The display control unit 320b controls the display unit 310b to display the transition destination display 1103 on the display unit 310b. The display control unit 320b acquires a piece of information about a transition destination for displaying the transition destination display 1103 from the transition destination information outputting unit 160.

The configuration as described above allows a PC 400 according to the present embodiment to separately display the web browser screen 1101 and the transition destination display 1103 on the display unit 310a and the display unit 310b, respectively. Additionally, each of the web browser screen 1101 and the transition destination display 1103 does not always have to be displayed on the same display unit 310, but the display unit 310 on which each of them is displayed may be automatically switched as necessary or by a user operation.

5. Fifth Embodiment: Display on Apparatus Different from Apparatus Displaying Screen Next, a fifth embodiment of the present disclosure will be described with reference to FIGS. 19 to 25.

(Apparatus Configuration)

Figure 19:
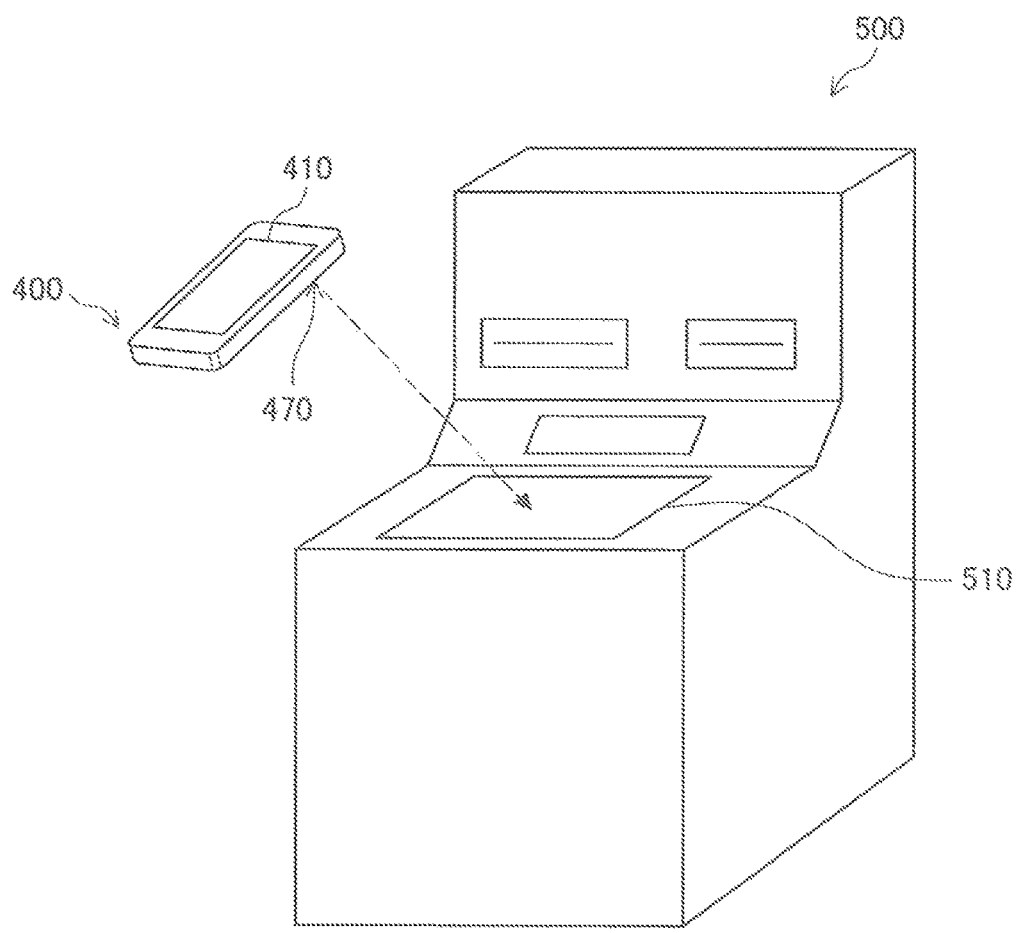
FIG. 19 is a diagram illustrating an external appearance of an apparatus according to a fifth embodiment of the present disclosure.

FIG. 19 is a diagram illustrating an external appearance of an apparatus according to the fifth embodiment of the present disclosure. An information processing apparatus according to the present embodiment is a smartphone 400 as illustrated in the figure. In addition to the illustrated example, the information processing apparatus according to the present embodiment may include a variety of apparatuses equipped with an imaging unit and a display unit as discussed below.

The smartphone 400 includes a display unit 410 and an imaging unit 470. The display unit 410 is formed of a liquid crystal display (LCD), an organic electro-luminescence (EL) display, or the like, for example. The display unit 410 has a touch sensor attached thereon. Contact of a user with the display unit 410 within a predetermined area can be acquired as an operation. The imaging unit 470 is formed of an image sensor and a lens, and a driving mechanism therefor, for example. The imaging unit 470 shoots an image of an area including a display unit 510 of an ATM 500.

Another apparatus according to the present embodiment is an automatic teller machine (ATM) as illustrated in the figure. The ATM 500 includes a display unit 510 in addition to slots for inserting and taking out cash, a card, and the like. For example, the display unit 510 is formed of a LCD or the like, and displays a variety of pieces of information about an operation on the ATM 500. The display unit 510 has a touch sensor attached thereon, and acquires contact of a user with the display unit 510 within a predetermined area as an operation.

The ATM 500 is not limited to ATMs, and yet may be a variety of apparatuses such as ticket-vending machines and fare adjustment machines as long as each of them includes a display unit that displays a piece of information for an operation like the display unit 510.

(Example of Screen Display)

Figure 20:
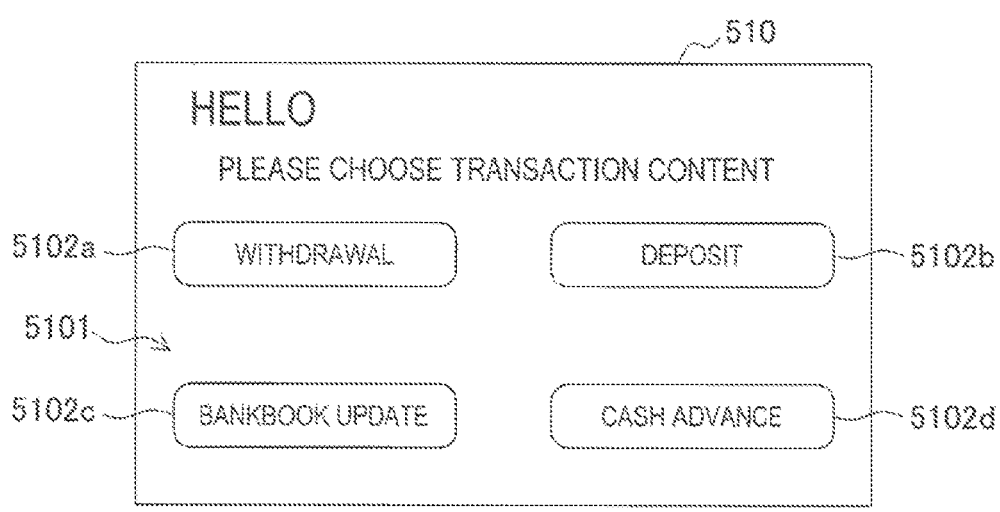
FIG. 20 is a diagram illustrating an example of an operation screen displayed in the fifth embodiment of the present disclosure.

FIG. 20 is a diagram illustrating an example of an operation screen displayed in the fifth embodiment of the present disclosure. An operation screen 5101 is displayed on the display unit 510 of the ATM 500. The operation screen 5101 includes a button 5102. A user comes into contact with the position corresponding to the button 5102 on the display unit 510, and can then provide an operation input to the ATM 500. The operation screen 5101 transitions in response to the operation input provided from the user by using the button 5102.

The ATM displays transaction content on the operation screen 5101 in the illustrated example, and yet other apparatuses such as ticket-vending machines and fare adjustment machines naturally display different content. Even if the apparatus is an ATM, different operation content may be displayed. In other words, the displayed content and design of the operation screen 5101 do not limit the embodiments of the present disclosure at all.

As discussed above, the operation screen 5101 includes the button 5102 as an input element. The button 5102 includes four buttons 5102a to 5102d corresponding to functions such as "withdrawal" and "deposit," in the illustrated example. Once a user pushes down any one of the buttons 5102 (more specifically, the user comes in contact with the display unit 510 within an area of the button 5102), the ATM 500 causes the operation screen 5101 to transition. Since the buttons 5102 are also input elements that cause a screen to transition, they are also submit elements.

When a user pushes down the button 5102, a piece of information indicating "the button 5102 has been pushed down" is acquired by the ATM 500. This piece of information can be regarded as a piece of input information corresponding to the button 5102, which is an input element. This piece of information is also a piece of input information indicating that the button 5102, which is a submit element, has executed a submit operation.

The ATM 500, which has acquired the piece of input information indicating "the button 5102 has been pushed down," acquires a piece of information about a transition destination of the operation screen 5101 corresponding to this piece of information. The ATM 500 may operate and generate the piece of information about the transition destination in accordance with a program stored therein. The ATM 500 may communicate with another apparatus such as a host computer to acquire the piece of information about the transition destination.

When the buttons 5102*a* to 5102*d* are each pushed down in the illustrated example, the ATM 500 acquires a piece of input information that is different for each of the buttons 5102*a* to 5102*d*. As a result, the ATM 500 may display the next operation screen that is different for each of the buttons 5102*a* to 5102*d*. However, a user does not know what kind of next operation screen is displayed when the user selects each of the buttons 5102.

The next operation screen displayed if each of the buttons 5102 was selected is then presented to a user as a transition destination display in the present embodiment. However the present embodiment is different from the first embodiment in that not the display unit 510 of the ATM 500 but the display unit 410 of the smartphone 400 displays a transition destination display in the present embodiment.

(Example of Transition Destination Display)

Figure 21:
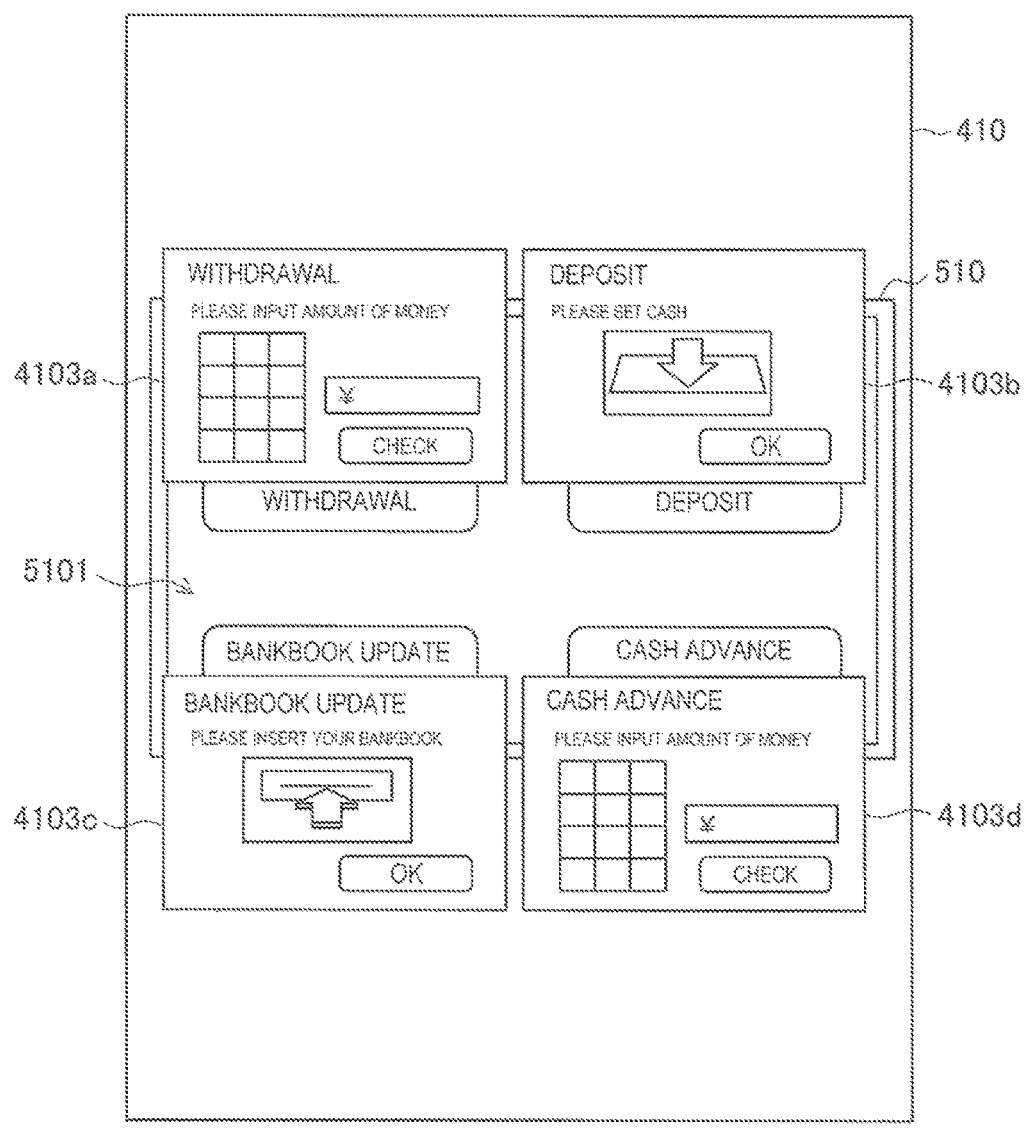
FIG. 21 is a diagram illustrating an example of a transition destination display in the fifth embodiment of the present disclosure.

FIG. 21 is a diagram illustrating an example of a transition destination display in the fifth embodiment of the present disclosure. The display unit 410 of the smartphone 400 displays an image of the display unit 510 of the ATM 500 acquired by the imaging unit 470 in the illustrated example. The display unit 510 displays the operation screen 5101 including the buttons 5102*a* to 5102*d*.

The display unit 410 further displays a transition destination display 4103 superimposed on the image of the display unit 510 of the ATM 500. The smartphone 400 recognizes the buttons 5102 included in the image acquired by the imaging unit 470 as markers, and then acquires a piece of next screen information corresponding to each of the buttons 5102, thereby displaying the transition destination display 4103.

Transition destination displays 4103*a* to 4103*d* corresponding to the respective buttons 5102*a* to 5102*d* are displayed in the illustrated example. For example, the transition destination display 4103*a* shows the next operation screen (screen for inputting the amount of withdrawal) displayed if the "withdrawal" button 5102*a* was selected. In the same way, the transition destination displays 4103*b* to 4103*d* also show the next operation screens displayed if the respective buttons 5102*b* to 5102*d* were selected.

This allows a user to know in advance what screen is displayed on the ATM 500 when the user selects each of the buttons 5102 displayed on the display unit 310, and then operate the ATM 500.

Additionally, the transition destination display 4103 does not necessarily have to be displayed for all of the buttons 5102. For example, the transition destination display 4103 may be displayed only for the button 5102 designated by a user coming into contact with the display unit 410 of the smartphone 400. For example, as in the third embodiment, when one or more of the buttons 5102 are selected, a series of screen transition for the one or more buttons 5102 may be displayed as still images or moving images.

(Modified Example of Screen Display)

Figure 22:
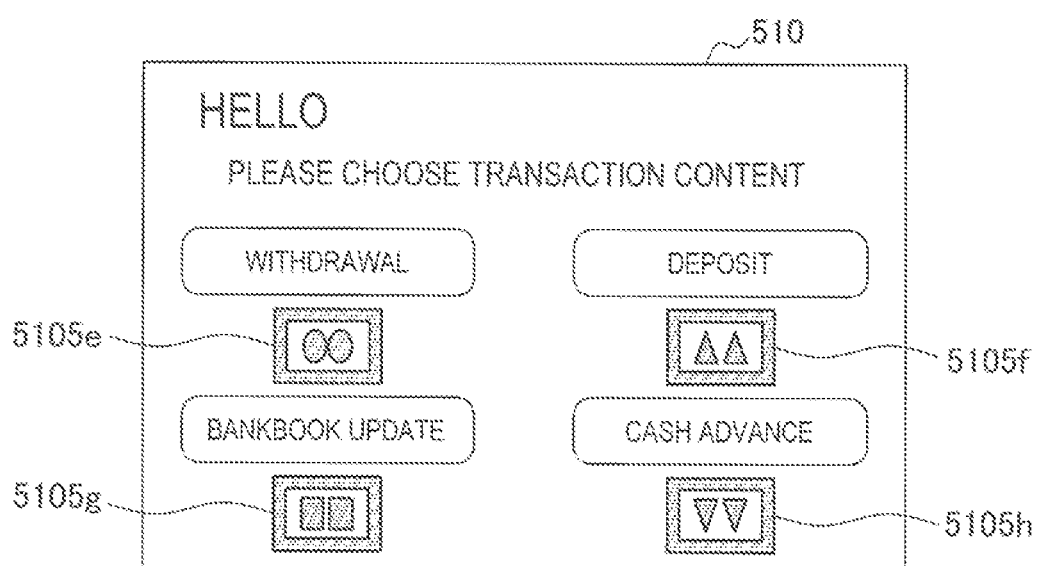
FIG. 22 is a diagram illustrating another example of an operation screen displayed in the fifth embodiment of the present disclosure.

FIG. 22 is a diagram illustrating another example of an operation screen displayed in the fifth embodiment of the present disclosure. The operation screen 5101 may display a marker 5105 in addition to the buttons 5102 as illustrated in the figure. This marker 5105 is recognized as a marker by the smartphone 400 instead of an image of the buttons 5102. This allows the smartphone 400 to display the transition destination 4103 on the display unit 410, the transition destination 4103 corresponding to each of the buttons 5102 included in the image.

Additionally displaying the marker 5105 corresponding to each of the buttons 5102 in this way may make the recognition easier and more accurate than the recognition of the buttons 5102 as markers.

(Functional Block)

Figure 23:
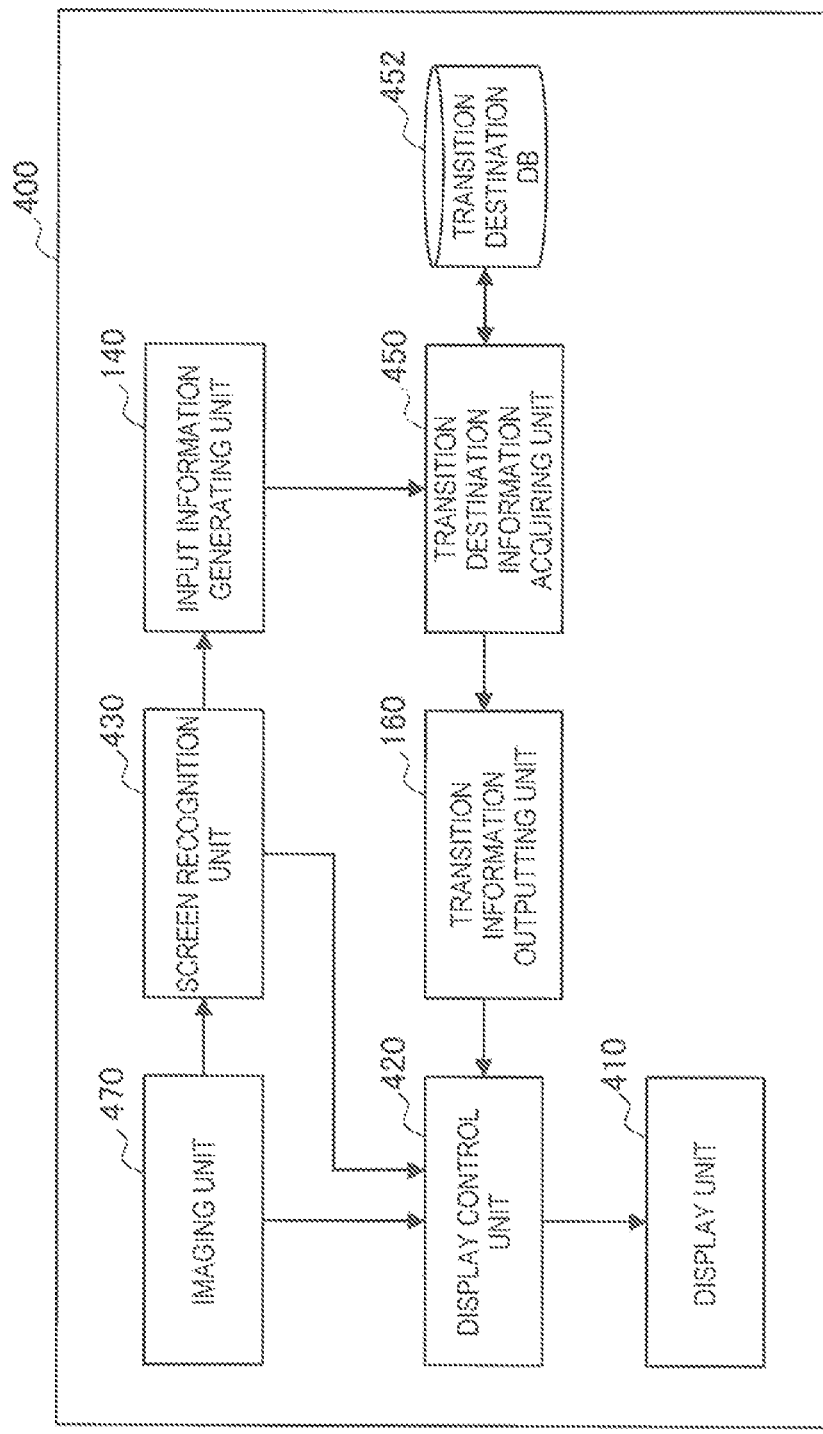
FIG. 23 is a block diagram illustrating a schematic functional configuration of an information processing apparatus according to the fifth embodiment of the present disclosure.

FIG. 23 is a block diagram illustrating a schematic functional configuration of the information processing apparatus according to the fifth embodiment of the present disclosure.

The smartphone 400 includes a display unit 410, a display control unit 420, a screen recognition unit 430, an input information generating unit 140, a transition destination information acquiring unit 450, a transition destination information outputting unit 160, and an imaging unit 470. A structural element other than the display unit 410 and the imaging unit 470 may be implemented as software using a CPU, RAM, and ROM, for example.

A part of the above-described functional configuration that can be the same as any of the first to fourth embodiments is assigned the same sign, which omits the detailed description.

The screen recognition unit 430 executes image recognition processing on a captured image provided from the imaging unit 470, and recognizes the button 5102, which is an input element included in the operation screen 5101. For example, the screen recognition unit 430 searches captured images for an image of the button 5102 on the basis of the predefined amount of characteristic for the image of the button 5102. The screen recognition unit 430 may recognize not only a submit element like the button 5102 but also an entry element such as a box for inputting the amount of money, which is not, however, shown in the illustrated example. The screen recognition unit 430 provides a piece of information about the recognized input element to the input information generating unit 140. The screen recognition unit 430 may output, to the display control unit 420, a piece of information about a position of the recognized input element in a captured image.

The transition destination information acquiring unit 450 references a transition destination DB 452 to acquire a piece of information about a transition destination corresponding to the piece of input information generated by the input information generating unit 140. The transition destination DB 452 may be, for example, provided along with operation assistance application software for the ATM 500 by a company (financial institution) managing the ATM 500. In this case, the transition destination information acquiring unit 450 may use the piece of input information to search a library of screens that may be displayed as the operation screen 5101, and then acquire the piece of information about the transition destination therefrom.

The display control unit 420 controls a display of the display unit 410. The display control unit 220 causes the display unit 410 to display a captured image including the operation screen 5101 of the ATM 500 provided from the imaging unit 470, and causes the display unit 410 to display the transition destination display 4103 in accordance with the piece of transition destination information provided from the transition destination information outputting unit 160. The display control unit 420 may decide the display position of the transition destination display 4103 on the basis of the piece of information about a position of the input element in the captured image, which has been provided, for example, from the screen recognition unit 430.

Figure 24:
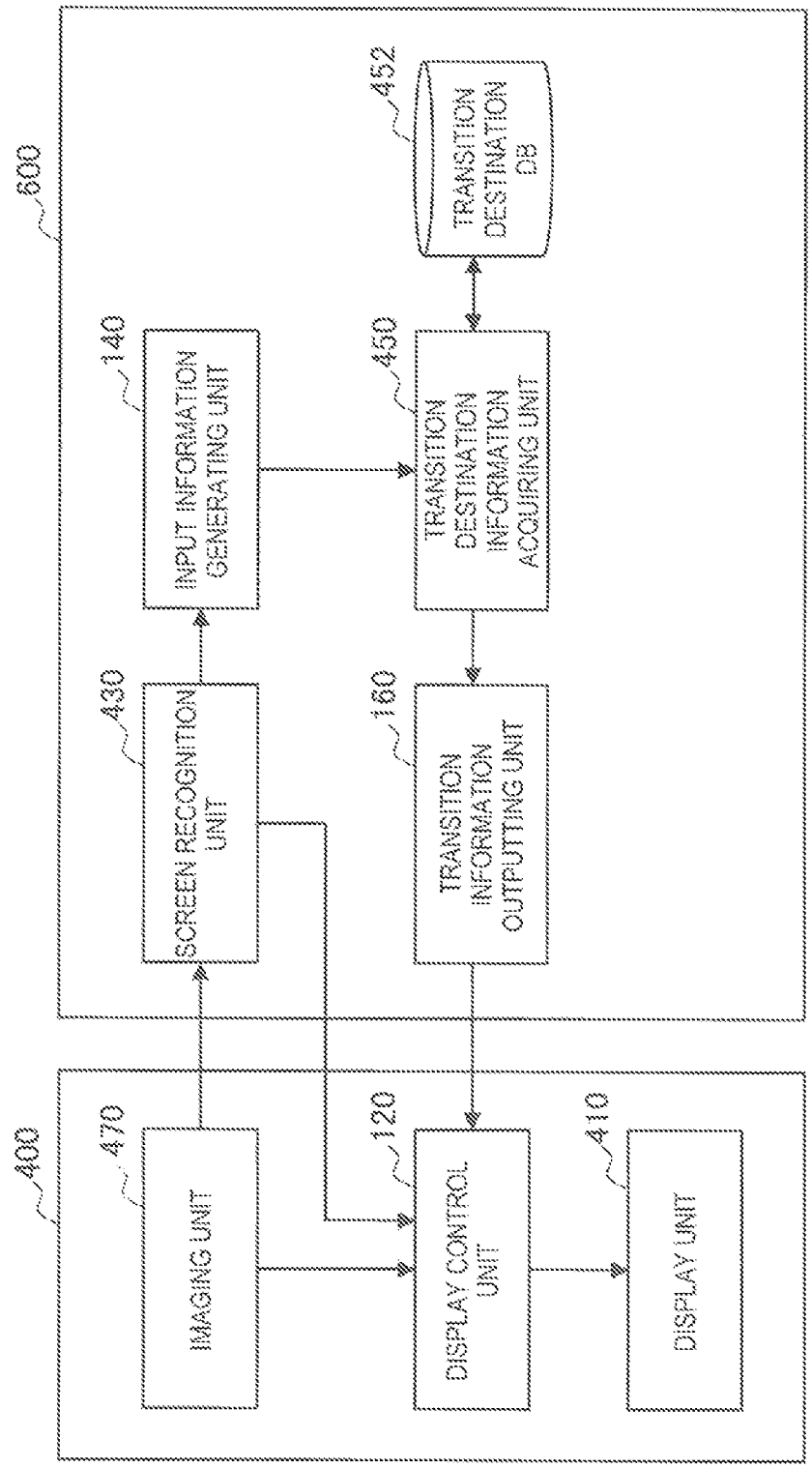
FIG. 24 is a block diagram illustrating an alternative functional configuration of the information processing apparatus according to the fifth embodiment of the present disclosure.

FIG. 24 is a block diagram illustrating an alternative functional configuration of the information processing apparatus according to the fifth embodiment of the present disclosure.

Among the same functional configuration as described in the example of FIG. 23, a server apparatus 600 provides the screen recognition unit 430, the input information generating unit 140, the transition destination information acquiring unit 450, and the transition destination information outputting unit 160 in the illustrated example. The smartphone 400 transmits a piece of information about a captured image acquired by the imaging unit 470 to the server apparatus 600 in this example. The server apparatus 600 uses the functions of the screen recognition unit 430, the input information generating unit 140, the transition destination information acquiring unit 450, and the transition destination information outputting unit 160 to output and transmit a piece of information about a transition destination to the smartphone 400. The smartphone 400 causes the display control unit 120 to display the transition destination display 4103 on the display unit 410 in accordance with the received piece of information.

The server apparatus 600 can execute at least a part of processing for causing the smartphone 400 to display the transition destination display 4103 in this way in the present embodiment. Likewise, a server apparatus can execute at least a part of the processing of the PC 100 and the PC 300 in the first to fourth embodiments. In this case, the server apparatuses may be the web server 200 or any other server apparatus.

Although specific operations of the processing of the screen recognition unit 430, the transition destination information acquiring unit 450, and the like are different, the whole processing procedures are the same in the present embodiment as in the first to fourth embodiments. The configurations and modified examples of the first to fourth embodiments can also be applied to the present embodiment.

6. Hardware Configuration

Lastly, a hardware configuration of an information processing apparatus according to an embodiment of the present disclosure will be described with reference to FIG. 25. FIG. 25 is a block diagram for describing the hardware configuration of the information processing apparatus. An information processing apparatus 900 illustrated in the figure may be implemented as the PC 100, the PC 300, the smartphone 400, and the server device 600 according to the above-described embodiments, for example.

The information processing apparatus 900 includes a central processing unit (CPU) 901, read only memory (ROM) 903, and random access memory (RAM) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a digital signal processor (DSP) instead of or in addition to the CPU 901.

The CPU 901 serves as an operation processor and a controller, and controls all or some operations in the information processing apparatus 900 in accordance with a variety of programs recorded on the ROM 903, the RAM 905, the storage device 919, or a removable recording medium 927. The ROM 903 stores a program and an operation parameter which are used by the CPU 901. The RAM 905 primarily stores a program which is used in the execution of the CPU 901 and a parameter which is appropriately modified in the execution. The CPU 901, the ROM 903, and the RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is a device which is operated by a user, such as a mouse, a keyboard, a touch panel, a button, a switch, and a lever. The input device 915 may be, for example, a remote control unit using infrared light or other radio waves, or may be an external connection device 929 such as a mobile phone operable in response to the operation of the information processing apparatus 900. The input device 915 includes an input control circuit which generates an input signal on the basis of a piece of information which is input by a user and outputs the input signal to the CPU 901. By operating the input device 915, a user inputs various types of data to the information processing apparatus 900 or requires a processing operation.

The output device 917 includes a device capable of visually or audibly notifying the user of an acquired piece of information. The output device 917 may include a display device such as a liquid crystal display (LCD), a plasma display panel (PDP) and an organic electro-luminescence (EL) display, an audio output device such as a speaker and a headphone, and a printer. The output device 917 may output a result obtained from the processing of the information processing apparatus 900 in a form of a video such as text and an image, and an audio such as voice and sound.

The storage device 919 is a device for data storage which is configured as an example of a storage unit of the information processing apparatus 900. The storage device 919 includes, for example, a magnetic storage device such as a hard disk drive (HDD), a semiconductor storage device, an optical storage device, or a magneto-optical storage device. The storage device 919 stores a program to be executed by the CPU 901, various data, and data obtained from the outside.

The drive 921 is a reader/writer for the removable recording medium 927 such as a magnetic disk, an optical disc, a magneto-optical disk, and a semiconductor memory, and is built in the information processing apparatus 900 or externally attached thereto. The drive 921 reads out a piece of information recorded in the removable recording medium 927 attached thereto, and outputs the read-out piece of information to the RAM 905. Further, the drive 921 can write record in the removable recording medium 927 attached thereto.

The connection port 923 is a port used to directly connect a device to the information processing apparatus 900. The connection port 923 may include, for example, a universal serial bus (USB) port, an IEEE1394 port, and a small computer system interface (SCSI) port. The connection port 923 may further include an RS-232C port, an optical audio terminal, a high-definition multimedia interface (HDMI) port, and so on. The connection of the external connection device 929 to the connection port 923 makes it possible to exchange various data between the information processing apparatus 900 and the external connection device 929.

The communication device 925 is, for example, a communication interface including a communication device or the like for a connection to a communication network 931.

The communication device 925 may be, for example, a communication card for a wired or wireless local area network (LAN), Bluetooth (registered trademark), a wireless USB (WUSB) or the like. In addition, the communication device 925 may be a router for optical communication, a router for an asymmetric digital subscriber line (ADSL), a modem for various kinds of communication, or the like. The communication device 925 transmits a signal to and receives a signal from, for example, the Internet or other communication devices based on a predetermined protocol such as TCP/IP. In addition, the communication network 931 connected to the communication device 925 may be a network connected in a wired or wireless manner, and may be, for example, the Internet, a home LAN, infrared communication, radio wave communication, satellite communication, or the like.

The imaging device 933 is a device that generates a captured image by shooting an image of real space using an image sensor such as a charge coupled device (CCD) or complementary metal oxide semiconductor (CMOS), as well as various members such as a lens for controlling the formation of a subject image on the image sensor, for example. The imaging device 933 may be a device that shoots a still image, and may also be a device that shoots a moving image.

The sensor 935 includes various sensors such as an acceleration sensor, a gyro sensor, a geomagnetic sensor, an optical sensor, and a sound sensor, for example. The sensor 935 acquires a piece of information about a state of the information processing apparatus 900, such as the orientation of the case of the information processing apparatus 900, as well as a piece of information about the environment surrounding the information processing apparatus 900, such as the brightness and noise surrounding the information processing apparatus 900, for example. The sensor 935 may also include a Global Positioning System (GPS) sensor that receives GPS signals and measures the latitude, longitude, and altitude of the apparatus.

The example of the hardware configuration of the information processing apparatus 900 has been described so far. Each of the above-described structural elements may be configured using general-purpose members, and may also be configured using hardware specialized in the function of each structural element. Such a configuration may also be modified as appropriate in accordance with the technological level at the time of the implementation.

7. Supplement

The embodiments of the present disclosure will be summarized below.

A piece of transition destination information may be generated by an information processing apparatus that a user is operating or a server apparatus that provides a service to an apparatus which a user is operating. In other words, information processing apparatuses that generate a piece of transition destination information are not necessarily limited to apparatuses operated by users in the embodiments of the present disclosure.

The piece of transition destination information may be an image displayed at a certain time point during screen transition as a result of a subsequent user operation. The displayed image may be different for each user operation. In that case, the pieces of transition destination information may pertain to one or more transition destinations selected from a plurality of different transition destinations using some criterion, or pertain to all of the transition destinations that can be displayed.

The pieces of transition destination information may be a series of images displayed by a user operation at a certain time point or later during screen transition. In this case, the series of images may be displayed as arranged still images, or displayed one by one as moving images. Providing the piece of transition information in this way may be regarded as a service for simulating processing that may result from a user operation at a certain time point or later. Additionally, the piece of transition destination information does not necessarily have to be directly displayed as an image (such as a still image and a moving image). The piece of transition destination information may also be displayed as a code (such as an AR marker and a QR code (registered trademark)) uniquely corresponding to the image and obtained through predetermined conversion processing. For example, an apparatus that shoots and displays an image of the code may convert the code into an image.

For example, a position at which a piece of transition destination information may be displayed on a display unit in a margin area within a screen (such as a web browser screen and an operation screen in the above-described example), or an area around the screen if the piece of transition destination information is displayed on the same display unit as the screen. Alternatively, a piece of transition destination information may be superimposed at least in part on an input element (operation target) such as a button included in a screen. A piece of transition destination information may be displayed on a display unit of an apparatus that is the same apparatus including a display unit displaying the screen.

A piece of transition destination information may also be displayed on a display unit of an apparatus connected via a dedicated cable or a network such as the Internet to another apparatus including a display unit for displaying a screen. A piece of transition destination information may be, for example, displayed as a screen image of a transition destination in each case. The screen image may be then reduced and displayed.

Furthermore, a piece of transition destination information may be displayed in a variety of states. For example, a piece of transition destination information may be displayed in a semi-transmissive state or a non-transmissive state. A piece of transition destination information may also be displayed on another window that can be deleted. A piece of transition destination information may be sent to an apparatus for displaying the piece of transition destination information through electronic mail, Internet Protocol (IP) communication, Bluetooth (registered trademark) communication, or the like. The piece of transition destination information is not necessarily sent automatically. For example, a user then accesses a server apparatus or the like to acquire the piece of transition destination information, so that the piece of transition destination information may be sent.

The embodiments of the present disclosure include, for example, an information processing apparatus as described above, a system including the information processing apparatus, a method executed by the information processing apparatus or the system, a program for causing the information processing apparatus to function, and a recording medium having the program recorded thereon.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An information processing apparatus including:

a screen recognition unit configured to recognize an input element included in a screen;

an input information generating unit configured to generate a piece of input information corresponding to the input element;

a transition destination information acquiring unit configured to acquire a piece of information about a transition destination of the screen, the piece of information about the transition destination corresponding to the piece of input information; and a transition destination information outputting unit configured to output the piece of information about the transition destination to display the piece of information about the transition destination separately from the screen.

(2)

The information processing apparatus according to (1), wherein the screen recognition unit recognizes the input element on the basis of a piece of information acquired from a first display control unit that controls a first display unit that displays the screen.

(3)

The information processing apparatus according to (2), wherein the transition destination information outputting unit outputs the piece of information about the transition destination to the first display control unit to cause the piece of information about the transition destination to be displayed on the first display unit.

(4)

The information processing apparatus according to (3), wherein the transition destination information outputting unit outputs the piece of information about the transition destination to cause the piece of information about the transition destination to be displayed as a code that another apparatus converts into a screen image, the other apparatus acquiring a captured image including the first display unit.

(5)

The information processing apparatus according to (2), wherein the transition destination information outputting unit outputs the piece of information about the transition destination to a second display control unit to cause the piece of information about the transition destination to be displayed on a second display unit that is different from the first display unit, the second display control unit controlling the second display unit.

(6)

The information processing apparatus according to (1), wherein the screen recognition unit recognizes the input element on the basis of a piece of information about a captured image including the screen.

(7)

The information processing apparatus according to (6), wherein the screen recognition unit recognizes an image of the input element included in the captured image.

(8)

The information processing apparatus according to (6), wherein the screen recognition unit recognizes a code located in a manner that the code corresponds to the input element, the code being included in the captured image.

(9)

The information processing apparatus according to any one of (1) to (3) and (5) to (8), wherein the transition destination information outputting unit outputs the piece of information about the transition destination to display the piece of information about the transition destination as a screen image.

(10)

The information processing apparatus according to any one of (1) to (9), wherein the input element includes a submit element that causes the screen to transition, and wherein the input information generating unit generates the piece of input information indicating that the submit element has executed a submit operation.

(11)

The information processing apparatus according to (10), wherein the screen recognition unit recognizes a plurality of the submit elements, wherein the input information generating unit generates pieces of input information indicating that the respective submit elements have executed submit operations, wherein the transition destination information acquiring unit acquires pieces of information about a plurality of transition destinations of the screen, the pieces of information about the plurality of transition destinations corresponding to the respective pieces of input information, and wherein the transition destination information outputting unit outputs the pieces of information about the plurality of transition destinations.

(12)

The information processing apparatus according to (11), wherein the transition destination information outputting unit outputs the pieces of information about the plurality of transition destinations to display the pieces of information about the plurality of transition destinations in association with the respective submit elements.

(13)

The information processing apparatus according to any one of (1) to (12), wherein the input element includes an entry element for inputting an item, and wherein the input information generating unit generates the piece of input information corresponding to the item.

(14)

The information processing apparatus according to (13), wherein the input information generating unit generates the piece of input information that is a dummy and corresponds to the item.

(15)

The information processing apparatus according to any one of (1) to (14), wherein the piece of information about the transition destination includes pieces of information about a series of screens displayed one by one with transition of the screen.

(16)

The information processing apparatus according to (15), wherein the transition destination information outputting unit outputs the piece of information about the transition destination to display the series of screens as arranged still images.

(17)

The information processing apparatus according to (15), wherein the transition destination information outputting unit outputs the piece of information about the transition destination to display the series of screens as moving images showing still images in succession.

(18)

The information processing apparatus according to any one of (15) to (17),
wherein the pieces of information about the series of screens correspond to the transition of the screen that continues until a series of processing is finished.

(19)

The information processing apparatus according to any one of (15) to (17),
wherein the pieces of information about the series of screens correspond to the transition of the screen that is performed a predetermined times.

(20)

A program for causing a computer to execute:
a function of recognizing an input element included in a screen;
a function of generating a piece of input information corresponding to the input element;
a function of acquiring a piece of information about a transition destination of the screen, the piece of information about the transition destination corresponding to the piece of input information; and
a function of outputting the piece of information about the transition destination to display the piece of information about the transition destination separately from the screen.

REFERENCE SIGNS LIST 100, 300 PC
110, 310, 410 display unit
1101 web browser screen
1102 button
1103, 4103 transition destination display
1104 transition destination code
1105 input box
1106 dummy item
120, 320, 420 display control unit
130, 430 screen recognition unit
140 input information generating unit
150, 450 transition destination information acquiring unit
160 transition destination information outputting unit
470 imaging unit
400 smartphone
500 ATM
510 display unit
5101 operation screen
5102 button
5105 marker
600 server apparatus

The invention claimed is:

1. An information processing apparatus comprising:
a screen recognition unit configured to recognize an input element included in a first image of a web browser screen, which upon selection of the input element, the first image is changed to a transition destination image;
an input information generating unit configured to generate a piece of input information corresponding to the input element;
a transition destination information acquiring unit configured to acquire a piece of information about the transition destination image, the piece of information about the transition destination corresponding to the piece of input information; and
a transition destination information outputting unit configured to output, prior to the selection of the input element, the piece of information about the transition destination image to display the piece of information about the transition destination image concurrently with a displaying of the first image,
wherein the screen recognition unit, the input information generating unit, the transition destination information acquiring unit and the transition destination information outputting unit are each implemented via at least one processor.

2. The information processing apparatus according to claim 1,
wherein the screen recognition unit recognizes the input element on the basis of a piece of information acquired from a first display control unit that controls a first display unit that displays the web browser screen.

3. The information processing apparatus according to claim 2,
wherein the transition destination information outputting unit outputs the piece of information about the transition destination image to the first display control unit to cause the piece of information about the transition destination image to be displayed on the first display unit.

4. The information processing apparatus according to claim 3,
wherein the transition destination information outputting unit outputs the piece of information about the transition destination image to cause the piece of information about the transition destination image to be displayed as a code that another apparatus converts into a screen image, the other apparatus acquiring a captured image including the first display unit.

5. The information processing apparatus according to claim 2,
wherein the transition destination information outputting unit outputs the piece of information about the transition destination image to a second display control unit to cause the piece of information about the transition destination image to be displayed on a second display unit that is different from the first display unit, the second display control unit controlling the second display unit.

6. The information processing apparatus according to claim 1,
wherein the screen recognition unit recognizes the input element on the basis of a piece of information about a captured image including the web browser screen.

7. The information processing apparatus according to claim 6,
wherein the screen recognition unit recognizes an image of the input element included in the captured image.

8. The information processing apparatus according to claim 6,
wherein the screen recognition unit recognizes a code located in a manner that the code corresponds to the input element, the code being included in the captured image.

9. The information processing apparatus according to claim 1,
wherein the transition destination information outputting unit outputs the piece of information about the transition destination image to display the piece of information about the transition destination image as a screen image.

10. The information processing apparatus according to claim 1,
wherein the input element includes a submit element that causes the the transition destination image to be displayed in place of the first image, and wherein the input information generating unit generates the piece of input information indicating that the submit element has executed a submit operation.

11. The information processing apparatus according to claim 10,
wherein the screen recognition unit recognizes a plurality of the submit elements,
wherein the input information generating unit generates pieces of input information indicating that the respective submit elements have executed submit operations,
wherein the transition destination information acquiring unit acquires pieces of information about a plurality of transition destination images of the web browser screen, the pieces of information about the plurality of transition destination images corresponding to the respective pieces of input information, and
wherein the transition destination information outputting unit outputs the pieces of information about the plurality of transition destination images.

12. The information processing apparatus according to claim 11,
wherein the transition destination information outputting unit outputs the pieces of information about the plurality of transition destination images to display the pieces of information about the plurality of transition destination images in association with the respective submit elements.

13. The information processing apparatus according to claim 1,
wherein the input element includes an entry element for inputting an item, and
wherein the input information generating unit generates the piece of input information corresponding to the item.

14. The information processing apparatus according to claim 13,
wherein the input information generating unit generates the piece of input information that is a dummy and corresponds to the item.

15. The information processing apparatus according to claim 1,
wherein the piece of information about the transition destination image includes pieces of information about a series of web browser screens displayed one by one with transition of the web browser screen.

16. The information processing apparatus according to claim 15,
wherein the transition destination information outputting unit outputs the piece of information about the transition destination image to display the series of web browser screens as arranged still images.

17. The information processing apparatus according to claim 15,
wherein the transition destination information outputting unit outputs the piece of information about the transition destination image to display the series of web browser screens as moving images showing still images in succession.

18. The information processing apparatus according to claim 15,
wherein the pieces of information about the series of web browser screens correspond to the transition of the web browser screen that continues until a series of processing is finished.

19. The information processing apparatus according to claim 15,
wherein the pieces of information about the series of web browser screens correspond to the transition of the web browser screen that is performed at predetermined times.

20. A non-transitory computer-readable storage medium having stored thereon a program, which when executed by a computer causes the computer to execute a method, the method comprising:
recognizing an input element included in a first image of a web browser screen, which upon selection of the input element, the first image is changed to a transition destination image;
generating a piece of input information corresponding to the input element;
acquiring a piece of information about the transition destination image of the web browser screen, the piece of information about the transition destination corresponding to the piece of input information; and
outputting, prior to the selection of the input element, the piece of information about the transition destination image to display the piece of information about the transition destination image concurrently with a displaying of the first image.

21. The information processing apparatus according to claim 1, wherein the transition destination information outputting unit is further configured to display a plurality of the piece of information about the transition destination image into a tab.

22. The information processing apparatus according to claim 1, wherein the transition destination information outputting unit is further configured to output a link indicating a relationship between the input element and the piece of information about the transition destination image.

23. The information processing apparatus according to claim 1, wherein the transition destination information outputting unit is further configured to replace the displayed first image of the web browser screen with the transition destination image when the input element is selected.

24. The information processing apparatus according to claim 1, wherein the transition destination information outputting unit is further configured to display the piece of information about the transition destination image separately from the first image when a cursor is detected to be in proximity of the input element.

* * * * *